(12) United States Patent
Kawai et al.

(10) Patent No.: US 9,798,798 B2
(45) Date of Patent: Oct. 24, 2017

(54) COMPUTER-IMPLEMENTED SYSTEM AND METHOD FOR SELECTING DOCUMENTS FOR REVIEW

(71) Applicant: FTI Technology LLC, Annapolis, MD (US)

(72) Inventors: Kenji Kawai, Seattle, WA (US); David T. McDonald, Seattle, WA (US)

(73) Assignee: FTI Technology, LLC, Annapolis, MD (US)

( * ) Notice: Subject to any disclaimer, the term of this patent is extended or adjusted under 35 U.S.C. 154(b) by 0 days.

(21) Appl. No.: 15/201,197

(22) Filed: Jul. 1, 2016

(65) Prior Publication Data

US 2016/0314190 A1 Oct. 27, 2016

Related U.S. Application Data

(63) Continuation of application No. 14/571,282, filed on Dec. 15, 2014, now Pat. No. 9,384,250, which is a
(Continued)

(51) Int. Cl.
*G06F 17/00* (2006.01)
*G06F 17/30* (2006.01)
(Continued)

(52) U.S. Cl.
CPC .... *G06F 17/30598* (2013.01); *G06F 11/1453* (2013.01); *G06F 17/30011* (2013.01);
(Continued)

(58) Field of Classification Search
CPC ......... G06F 17/30156; G06F 17/30412; G06F 17/30424; G06F 17/30572; G06F 17/30598
(Continued)

(56) References Cited

U.S. PATENT DOCUMENTS 4,653,048 A 3/1987 Anderson
5,050,212 A 9/1991 Dyson
(Continued)

FOREIGN PATENT DOCUMENTS

WO WO 2006/008733 1/2006

OTHER PUBLICATIONS

Pelleg et al., "Accelerating Exact K-Means Algorithms With Geometric Reasoning," School of Computer Science, Carnegie Mellon University, Pittsburgh, Date: 1999.
(Continued)

*Primary Examiner* — Phong Nguyen
(74) *Attorney, Agent, or Firm* — Patrick J. S. Inouye; Krista A. Wittman

(57) ABSTRACT

A computer-implemented system and method for selecting documents for review is provided. A master array of messages and topics for the messages is generated. The messages in the master array are sorted by the topics and the sorted messages are processed. During processing, each message in the master array is identified as unique, duplicate, or near duplicate. The unique messages are extracted from the duplicate and near duplicate messages, and entered into a log by creating a log entry for each of the unique messages. Each log entry includes a source of and identification information for one of the unique messages. The unique messages are then provided for document review.

16 Claims, 22 Drawing Sheets

Related U.S. Application Data continuation of application No. 14/148,713, filed on Jan. 6, 2014, now Pat. No. 8,914,331, which is a continuation of application No. 13/909,065, filed on Jun. 3, 2013, now Pat. No. 8,626,767, which is a continuation of application No. 13/361,900, filed on Jan. 30, 2012, now Pat. No. 8,458,183, which is a continuation of application No. 12/946,797, filed on Nov. 15, 2010, now Pat. No. 8,108,397, which is a continuation of application No. 12/542,581, filed on Aug. 17, 2009, now Pat. No. 7,836,054, which is a continuation of application No. 11/410,370, filed on Apr. 24, 2006, now Pat. No. 7,577,656, which is a continuation of application No. 10/965,564, filed on Oct. 13, 2004, now Pat. No. 7,035,876, which is a continuation of application No. 10/627,466, filed on Jul. 25, 2003, now Pat. No. 6,820,081, which is a continuation-in-part of application No. 09/812,749, filed on Mar. 19, 2001, now Pat. No. 6,745,197.

(51) Int. Cl.
*G06Q 10/10* (2012.01)
*H04L 12/58* (2006.01)
*G06F 11/14* (2006.01)

(52) U.S. Cl.
CPC .. *G06F 17/30156* (2013.01); *G06F 17/30412* (2013.01); *G06F 17/30424* (2013.01); *G06F 17/30572* (2013.01); *G06Q 10/107* (2013.01); *H04L 51/08* (2013.01); *H04L 51/22* (2013.01); *H04L 51/16* (2013.01); *Y10S 707/99937* (2013.01); *Y10S 707/99943* (2013.01); *Y10S 707/99944* (2013.01); *Y10S 707/99945* (2013.01); *Y10S 707/99948* (2013.01)

(58) Field of Classification Search
USPC .................. 707/626, 664, 692, 737, 752
See application file for complete search history.

(56) References Cited

U.S. PATENT DOCUMENTS

| | | | |
|---|---|---|---|
| 5,056,021 A | 10/1991 | Ausborn | |
| 5,317,568 A | 5/1994 | Bixby et al. | |
| 5,477,451 A | 12/1995 | Brown et al. | |
| 5,488,725 A | 1/1996 | Turtle et al. | |
| 5,699,500 A | 12/1997 | Dasgupta | |
| 5,732,265 A | 3/1998 | Dewitt et al. | |
| 5,757,669 A | 5/1998 | Christie et al. | |
| 5,799,276 A | 8/1998 | Komissarchik et al. | |
| 5,860,136 A | 1/1999 | Fenner | |
| 5,862,325 A | 1/1999 | Reed et al. | |
| 5,867,799 A | 2/1999 | Lang et al. | |
| 5,905,863 A | 5/1999 | Knowles et al. | |
| 5,909,677 A | 6/1999 | Broder et al. | |
| 5,915,024 A | 6/1999 | Kitaori et al. | |
| 5,950,146 A | 9/1999 | Vapnik | |
| 5,987,432 A * | 11/1999 | Zusman ............. G06Q 40/00 705/35 | |
| 6,026,397 A | 2/2000 | Sheppard | |
| 6,119,124 A | 9/2000 | Broder et al. | |
| 6,137,911 A | 10/2000 | Zhilyaev | |
| 6,148,102 A | 11/2000 | Stolin | |
| 6,167,368 A | 12/2000 | Wacholder | |
| 6,173,275 B1 | 1/2001 | Caid et al. | |
| 6,189,002 B1 | 2/2001 | Roitblat | |
| 6,219,715 B1 | 4/2001 | Ohno et al. | |
| 6,223,209 B1 | 4/2001 | Watson | |
| 6,230,155 B1 | 5/2001 | Broder et al. | |
| 6,240,409 B1 | 5/2001 | Aiken | |
| 6,263,348 B1 | 7/2001 | Kathrow et al. | |
| 6,292,880 B1 | 9/2001 | Beguelin et al. | |
| 6,314,425 B1 | 11/2001 | Serbinis et al. | |
| 6,330,589 B1 | 12/2001 | Kennedy | |
| 6,345,243 B1 | 2/2002 | Clark | |
| 6,349,296 B1 | 2/2002 | Broder et al. | |
| 6,389,433 B1 | 5/2002 | Bolosky | |
| 6,421,709 B1 | 7/2002 | McCormick et al. | |
| 6,438,564 B1 | 8/2002 | Morton | |
| 6,442,592 B1 | 8/2002 | Alumbaugh et al. | |
| 6,446,061 B1 | 9/2002 | Doerre et al. | |
| 6,453,327 B1 | 9/2002 | Nielsen | |
| 6,480,885 B1 | 11/2002 | Oliver | |
| 6,484,196 B1 | 11/2002 | Maurille | |
| 6,507,847 B1 | 1/2003 | Fleischman | |
| 6,510,406 B1 | 1/2003 | Marchisio | |
| 6,523,063 B1 | 2/2003 | Hanson et al. | |
| 6,549,957 B1 | 4/2003 | Hanson et al. | |
| 6,560,597 B1 | 5/2003 | Dhillon et al. | |
| 6,584,564 B2 | 6/2003 | Olkin et al. | |
| 6,598,054 B2 | 7/2003 | Schuetze et al. | |
| 6,643,686 B1 * | 11/2003 | Hall ............... G06Q 10/107 709/206 | |
| 6,654,739 B1 | 11/2003 | Apte et al. | |
| 6,658,423 B1 * | 12/2003 | Pugh ................ G06F 17/3071 707/E17.058 | |
| 6,675,159 B1 | 1/2004 | Lin et al. | |
| 6,678,705 B1 | 1/2004 | Berchtold et al. | |
| 6,701,305 B1 | 3/2004 | Holt et al. | |
| 6,711,585 B1 | 3/2004 | Copperman et al. | |
| 6,745,197 B2 | 6/2004 | McDonald | |
| 6,751,628 B2 | 6/2004 | Coady | |
| 6,820,081 B1 | 11/2004 | Kawai et al. | |
| 6,915,334 B1 * | 7/2005 | Hall ............... G06Q 10/107 370/352 | |
| 7,003,551 B2 | 2/2006 | Malik | |
| 7,020,645 B2 | 3/2006 | Bisbee et al. | |
| 7,035,876 B2 | 4/2006 | Kawai et al. | |
| 7,035,903 B1 | 4/2006 | Baldonado | |
| 7,117,246 B2 | 10/2006 | Christenson et al. | |
| 7,209,949 B2 | 4/2007 | Mousseau et al. | |
| 7,240,199 B2 | 7/2007 | TomKow | |
| 7,266,365 B2 | 9/2007 | Ferguson et al. | |
| 7,325,127 B2 | 1/2008 | Olkin et al. | |
| 7,353,204 B2 | 4/2008 | Liu | |
| 7,366,718 B1 * | 4/2008 | Pugh ................ G06F 17/3071 707/E17.058 | |
| 7,412,462 B2 | 8/2008 | Margolus et al. | |
| 7,577,656 B2 | 8/2009 | Kawai et al. | |
| 7,836,054 B2 | 11/2010 | Kawai et al. | |
| 7,945,600 B1 * | 5/2011 | Thomas ............ G06F 17/30707 707/804 | |
| 2001/0056362 A1 | 12/2001 | Hanagan et al. | |
| 2002/0065912 A1 | 5/2002 | Catchpole et al. | |
| 2002/0120711 A1 * | 8/2002 | Bantz ................ H04L 51/00 709/217 | |
| 2002/0122543 A1 * | 9/2002 | Rowen ............. G06F 17/30336 379/93.01 | |
| 2002/0161788 A1 * | 10/2002 | McDonald ........ G06Q 10/107 707/999.203 | |
| 2002/0163912 A1 * | 11/2002 | Carlson ................ H04L 45/122 370/392 | |
| 2002/0184193 A1 | 12/2002 | Cohen | |
| 2006/0195538 A1 * | 8/2006 | Miller ................. G06Q 10/107 709/206 | |
| 2007/0011244 A1 * | 1/2007 | O'Neal ................ H04L 51/063 709/206 | |
| 2008/0162478 A1 * | 7/2008 | Pugh .................. G06F 17/3071 707/E17.001 | |
| 2012/0078871 A1 * | 3/2012 | Pugh .................. G06F 17/3071 707/706 | |
| 2015/0100595 A1 * | 4/2015 | Kawai ................ G06Q 10/107 707/755 | |

OTHER PUBLICATIONS

D. Gourley, B. Totty, "HTTP, The Definite Guide," pp. 288-299, O'Reilly and Associates, Inc., Sebastopol, CA (2002).

(56) References Cited

OTHER PUBLICATIONS

Linhui, Jiang, "K-Mean Algorithm: Iterative Partitioning Clustering Algorithm," http://www.cs.regina.ca/~linhui/K_mean_algorithm.html, (2001) Computer Science Department, University of Regina, Saskatchewan, Canada.
Kanugo et al., "The Analysis of a Simple K-Means Clustering Algorithm," pp. 100-109, Proc 16th annual symposium of computational geometry (May 2000).
Jain et al., "Data Clustering: A Review," vol. 31, No. 3, ACM Computing surveys, (Sep. 1999).
R. Orfali et al., "Client/Server Survival Guide," Ch. 19, John Wiley & Sons, Inc. (1999 3rd ed.).
Christina Yip Chung et al., "Thematic Mapping—From Unstructured Documents to Taxonomies," CIKM'02, Nov. 4-9, 2002, pp. 608-610, ACM, McLean, Virginia, USA.
Hiroyuki Kawano, "Overview of Mondou Web Search Engine Using Text Mining and Information Visualizing Technologies," IEEE, 2001, pp. 234-241.
James Osborn et al., "Justice: A Judicial Search Tool Using Intelligent Concept Extraction," ICAIL-99, 1999, pp. 173-181, ACM.
Chen An et al., "Fuzzy Concept Graph and Application in Web Document Clustering," 2001, pp. 101-106, IEEE.
"Distribution Duplication Prevention Mechanism," Kenenth Mason Publications, No. 336, p. 261, Great Britain (Apr. 1992).

\* cited by examiner

81 { From: User1 [User1@aol.com]
Sent: Monday, January 22, 2001 8:33 PM
To: User3@aol.com
Subject: FW: Original Message ◄— 83

82 { This message is a forwarded email message.

- - - - - Original Message - - - - - - ◄— 84
77 { From: User2 [mailto: User2@aol.com]
Sent: Monday, January 22, 2001 8:31 PM
To: User1
Subject: RE: Original Message ◄— 79

78 { This message is a reply email message.

- - - - - Original Message - - - - - - ◄— 80
75 { From: User1 [mailto: User1@aol.com]
Sent: Monday, January 22, 2001 8:30 PM
To: User2@aol.com
Subject: Original Message ◄— 76

74 { This message is an original email message.

71, 72, 73

240

COMPUTER-IMPLEMENTED SYSTEM AND METHOD FOR SELECTING DOCUMENTS FOR REVIEW

CROSS-REFERENCE TO RELATED APPLICATION

This patent application is a continuation of U.S. patent application Ser. No. 14/571,282, filed Dec. 15, 2014, pending; which is a continuation of U.S. Pat. No. 8,914,331, issued Dec. 16, 2014; which is a continuation of U.S. Pat. No. 8,626,767, issued Jan. 7, 2014; which is a continuation of U.S. Pat. No. 8,458,183, issued Jun. 4, 2013; which is a continuation of U.S. Pat. No. 8,108,397, issued Jan. 31, 2012; which is a continuation of U.S. Pat. No. 7,836,054, issued Nov. 16, 2010; which is a continuation of U.S. Pat. No. 7,577,656, issued Aug. 18, 2009; which is a continuation of U.S. Pat. No. 7,035,876, issued Apr. 25, 2006; which is a continuation of U.S. Pat. No. 6,820,081, issued Nov. 16, 2004; which is a continuation-in-part of U.S. Pat. No. 6,745,197, issued Jun. 1, 2004, the priority dates of which are claimed and the disclosures of which are incorporated by reference.

FIELD

The present invention relates in general to stored message categorization and, in particular, to a computer-implemented system and method for selecting documents for review.

BACKGROUND

Presently, electronic messaging constitutes a major form of interpersonal communications, complimentary to, and, in some respects, replacing, conventional voice-based communications. Electronic messaging includes traditional electronic mail (e-mail) and has grown to encompass scheduling, tasking, contact and project management, and an increasing number of automated workgroup activities. Electronic messaging also includes the exchange of electronic documents and multimedia content, often included as attachments. And, unlike voice mail, electronic messaging can easily be communicated to an audience ranging from a single user, a workgroup, a corporation, or even the world at large, through pre-defined message address lists.

The basic electronic messaging architecture includes a message exchange server communicating with a plurality of individual subscribers or clients. The message exchange server acts as an electronic message custodian, which maintains, receives and distributes electronic messages from the clients using one or more message databases. Individual electronic messaging information is kept in message stores, referred to as folders or archives, identified by user account within the message databases. Generally, by policy, a corporation will archive the message databases as historical data storing during routine backup procedures.

The information contained in archived electronic messages can provide a potentially useful chronology of historically significant events. For instance, message conversation threads present a running dialogue which can chronicle the decision making processes undertaken by individuals during the execution of their corporate responsibilities. As well, individual message store archives can corroborate the receipt and acknowledgment of certain corporate communications both locally and in distributed locations. And the archived electronic message databases create useful audit trails for tracing information flow.

Consequently, fact seekers are increasingly turning to archived electronic message stores to locate crucial information and to gain insight into individual motivations and behaviors. In particular, electronic message stores are now almost routinely produced during the discovery phase of litigation to obtain evidence and materials useful to the litigants and the court. Discovery involves document review during which all relevant materials are read and analyzed. The document review process is time consuming and expensive, as each document must ultimately be manually read. Pre-analyzing documents to remove duplicative information can save significant time and expense by paring down the review field, particularly when dealing with the large number of individual messages stored in each of the archived electronic messages stores for a community of users.

Typically, electronic messages maintained in archived electronic message stores are physically stored as data objects containing text or other content. Many of these objects are duplicates, at least in part, of other objects in the message store for the same user or for other users. For example, electronic messages are often duplicated through inclusion in a reply or forwarded message, or as an attachment. A chain of such recursively-included messages constitutes a conversation "thread." In addition, broadcasting, multitasking and bulk electronic message "mailings" cause message duplication across any number of individual electronic messaging accounts.

Although the goal of document pre-analysis is to pare down the size of the review field, the simplistic removal of wholly exact duplicate messages provides only a partial solution. On average, exactly duplicated messages constitute a small proportion of duplicated material. A much larger proportion of duplicated electronic messages are part of conversation threads that contain embedded information generated through a reply, forwarding, or attachment. The message containing the longest conversation thread is often the most pertinent message since each of the earlier messages is carried forward within the message itself. The messages comprising a conversation thread are "near" exact duplicate messages, which can also be of interest in showing temporal and substantive relationships, as well as revealing potentially duplicated information.

In the prior art, electronic messaging applications provide limited tools for processing electronic messages. Electronic messaging clients, such as the Outlook product, licensed by Microsoft Corporation, Redmond, Wash., or the cc:mail product, licensed by Lotus Corporation, Cambridge, Mass., provide rudimentary facilities for sorting and grouping stored messages based on literal data occurring in each message, such as sender, recipient, subject, send date and so forth. Attachments are generally treated as separate objects and are not factored into sorting and grouping operations. However, these facilities are limited to processing only those messages stored in a single user account and are unable to handle multiple electronic message stores maintained by different message custodians. In addition, the systems only provide partial sorting and grouping capabilities and do not provide for culling out message with duplicate attachments.

Therefore, there is a need for an approach to processing electronic messages maintained in multiple message stores for document pre-analysis. Preferably, such an approach would identify messages duplicative both in literal content, as well as with respect to attachments, independent of source, and would "grade" the electronic messages into categories that include unique, exact duplicate, and near duplicate messages, as well as determine conversation thread length.

There is a further need for an approach to identifying unique messages and related duplicate and near duplicate messages maintained in multiple message stores. Preferably, such an approach would include an ability to separate unique messages and to later reaggregate selected unique messages with their related duplicate and near duplicate messages as necessary.

There is a further need for an approach to processing electronic messages generated by Messaging Application Programming Interface (MAPI)-compliant applications.

SUMMARY

The present invention provides a system and method for generating a shadow store storing messages selected from an aggregate collection of message stores. The shadow store can be used in a document review process. The shadow store is created by extracting selected information about messages from each of the individual message stores into a master array. The master array is processed to identify message topics, which occur only once in the individual message stores and to then identify the related messages as unique. The remaining non-unique messages are processed topic by topic in a topic array from which duplicate, near duplicate and unique messages are identified. In addition, thread counts are tallied. A log file indicating the nature and location of each message and the relationship of each message to other messages is generated. Substantially unique messages are copied into the shadow store for use in other processes, such as a document review process. Optionally, selected duplicate and near duplicate messages are also copied into the shadow store or any other store containing the related unique message.

An embodiment provides a computer-implemented system and method for selecting documents for review. A master array of messages and topics for the messages is generated. The messages in the master array are sorted by the topics and the sorted messages are processed. During processing, each message in the master array is identified as unique, duplicate, or near duplicate. The unique messages are extracted from the duplicate and near duplicate messages and entered into a log by creating a log entry for each of the unique messages. Each log entry includes a source of and identification information for one of the unique messages. The unique messages are then provided for document review.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 shows, by way of example, an annotated electronic message.

DETAILED DESCRIPTION

Figure 1:
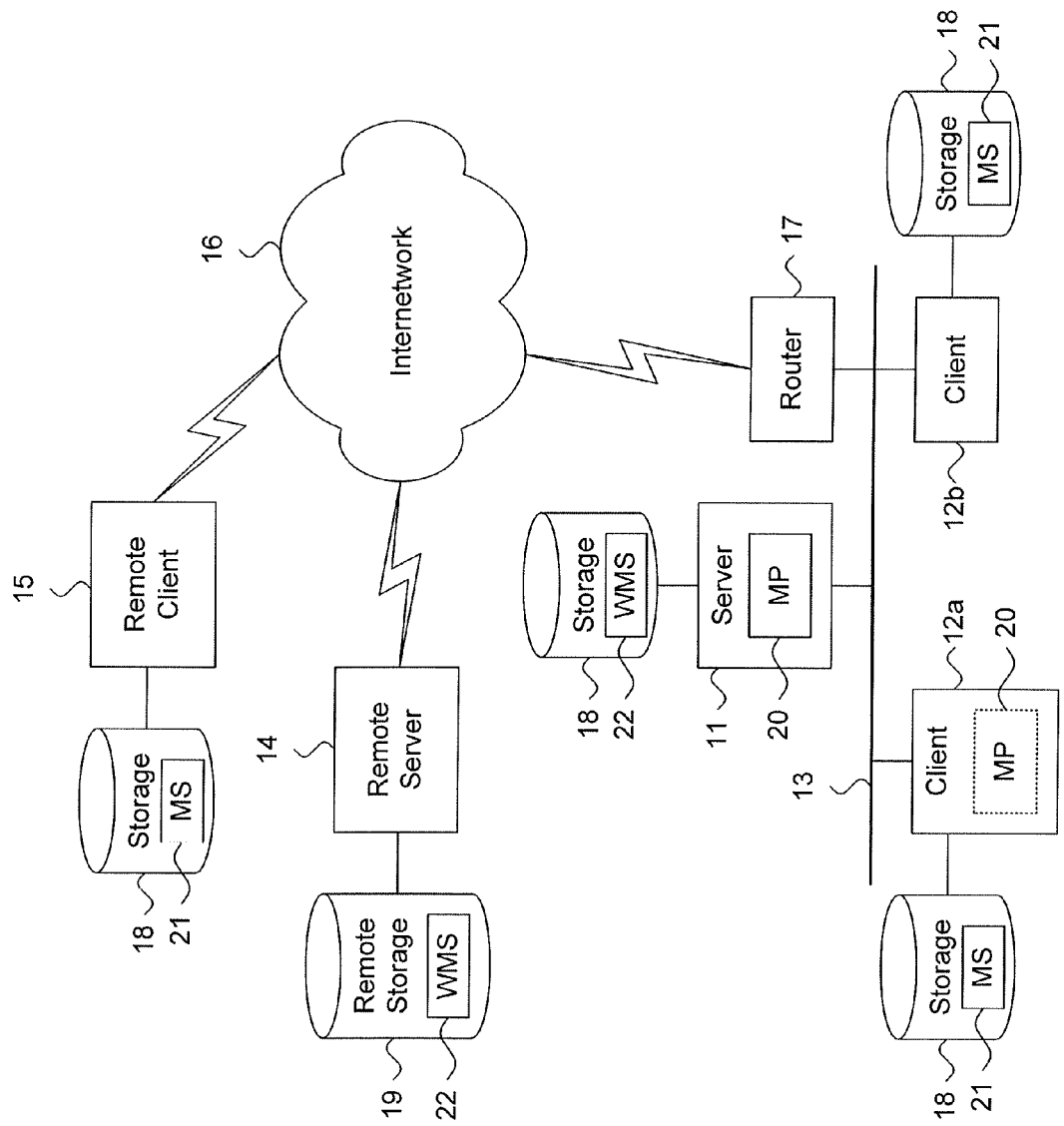
FIG. 1 is a functional block diagram showing a distributed computing environment, including a system for efficiently processing messages stored in multiple message stores, in accordance with the present invention.

FIG. 1 is a functional block diagram showing a distributed computing environment 10, including a system for efficiently processing messages stored in multiple message stores, in accordance with the present invention. The distributed computing environment 10 includes an internetwork 16, including the Internet, and an intranetwork 13. The internetwork 16 and intranetwork 13 are interconnected via a router 17 or similar interconnection device, as is known in the art. Other network topologies, configurations, and components are feasible, as would be recognized by one skilled in the art.

Electronic messages, particularly electronic mail (email), are exchanged between the various systems interconnected via the distributed computing environment 10. Throughout this document, the terms "electronic message" and "message" are used interchangeably with the same intended meaning. In addition, message types encompass electronic mail, voice mail, images, scheduling, tasking, contact management, project management, workgroup activities, multimedia content, and other forms of electronically communicable objects, as would be recognized by one skilled in the art. These systems include a server 11 providing a message exchange service to a plurality of clients 12a, 12b interconnected via the intranetwork 13. The clients 12a, 12b can also subscribe to a remote message exchange service provided by a remote server 14 interconnected via the internetwork 16. Similarly, a remote client 15 can subscribe to either or both of the message exchange services from the server 11 and the remote server 14 via the internetwork 16.

Each of the systems is coupled to a storage device. The server 11, clients 12a, 12b, and remote client 15 each maintain stored data in a local storage device 18. The remote server 14 maintains stored data in a local storage device (not shown) and can also maintain stored data for remote systems in a remote storage device 19, that is, a storage device situated remotely relative to the server 11, clients 12a, 12b, and remote client 15. The storage devices include conventional hard drives, removable and fixed media, CD ROM and DVD drives, and all other forms of volatile and non-volatile storage devices.

Each of the systems also maintains a message store, either on the local storage device or remote storage device, in which electronic messages are stored or archived. Each message store constitutes an identifiable repository within which electronic messages are kept and can include an integral or separate archive message store for off-line storage. Internally, each message store can contain one or more message folders (not shown) containing groups of related messages, such as an "Inbox" message folder for incoming messages, an "Outbox" message folder for outgoing messages, and the like. For clarity of discussion, individual message folders will be treated alike, although one skilled in the art would recognize that contextually related message folders might be separately processed.

In a workgroup-computing environment, the server 11 collectively maintains the message stores as a workgroup message store (WMS) 22 for each subscribing client 12a, 12b and remote client 15. In a distributed computing environment, each client 12a, 12b and remote client 15 might maintain an individual message store 21 either in lieu of or in addition to a workgroup message store 21. Similarly, the remote server 14 could maintain a workgroup message store 22 for remote clients.

Over time, each of the message stores unavoidably accumulates duplicates, at least in part, of other electronic messages stored in the message store for the same user or for other users. These duplicate and near duplicate electronic messages should be identified and removed during document pre-analysis. Thus, the server 11 includes a message processor 20 for efficiently processing the electronic messages stored in the various message stores 21, 22 as further described below beginning with reference to FIG. 2. Optionally, an individual client 12a could also include the message processor 20. The actual homing of the message processor 20 is only limited by physical resource availability required to store and process individual message stores 21 and workgroup message stores 22.

The electronic messages are retrieved directly from the individual message stores 21, the workgroup message stores 22, or consolidated from these message stores into a combined message store. For document pre-analysis, the message stores can include both active "on-line" messages and archived "off-line" messages maintained in a local storage device 18 or remote storage device 19.

The individual computer systems including the server 11, clients 12, remote server 14, and remote client 15, are general purpose, programmed digital computing devices consisting of a central processing unit (CPU), random access memory (RAM), non-volatile secondary storage, such as a hard drive, CD ROM or DVD drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
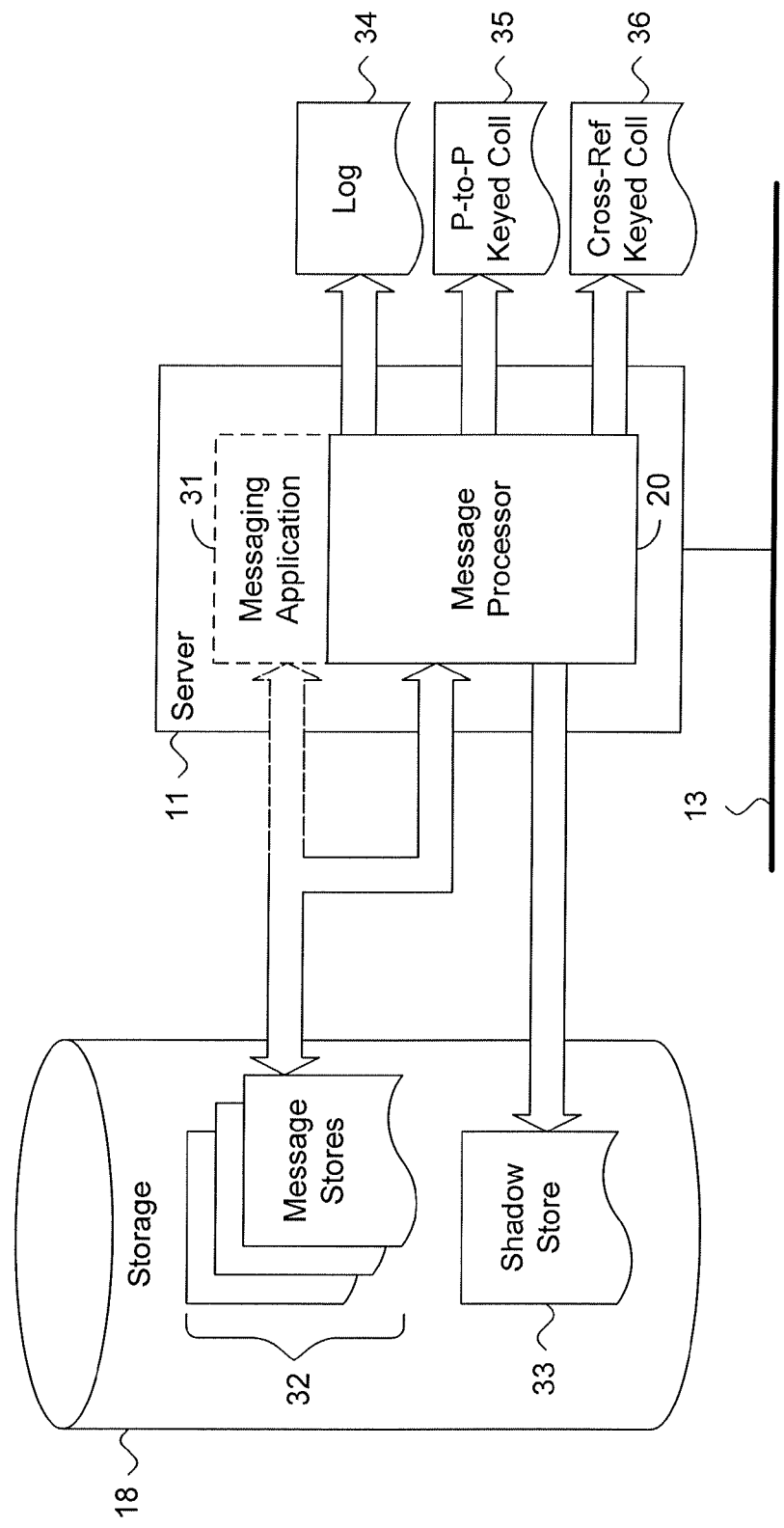
FIG. 2 is a block diagram showing the system for efficiently processing messages of FIG. 1.

FIG. 2 is a block diagram showing the system for efficiently processing messages of FIG. 1. The system 30 includes the server 11, storage device 18, and one or more message stores 32. The message stores 32 could include individual message stores 21 and workgroup message stores 22 (shown in FIG. 1). Alternatively, the system 30 could include a client 12a (not shown) instead of the server 11.

The server 11 includes the messages processor 20 and optionally operates a messaging application 31. The messaging application 31 provides services with respect to electronic message exchange and information storage to individual clients 12a, 12b, remote servers 14, and remote clients 15 (shown in FIG. 1). On an application side, these services include providing electronic mail, scheduling, tasking, contact and project management, and related automated workgroup activities support. On a system side, these services include message addressing storage and exchange, and interfacing to low-level electronic messaging subsystems. An example of a message exchange server 31 is the Exchange Server product, licensed by Microsoft Corporation, Redmond, Wash. Preferably, the message exchange server 31 incorporates a Messaging Application Programming Interface (MAPI)-compliant architecture, such as described in R. Orfali et al., "Client/Server Survival Guide," Ch. 19, John Wiley & Sons, Inc. (1999 3d ed.), the disclosure of which is incorporated by reference. The messaging application is not a part of the present invention, but is shown to illustrate a suitable environment in which the invention may operate.

The message processor 20 processes the message stores 32 (shown in FIG. 1) to efficiently pre-analyze the electronic messages, as further described below with reference to FIG. 3. The message stores 32 are processed to create one or more constructs stored into a "shadow" store 33. A point-to-point keyed collection 35 stores cross-references between the identifier of the original message store 32 or folder in the original message store and the identifier of the newly created corresponding folder or subfolder in the shadow store 33. During processing, the electronic messages are "graded" into duplicate, near duplicate and unique categories and tagged by longest conversation thread.

The results of message processing are chronicled into a log 34 to identify unique messages 44 and to create a processing audit trail for allowing the source and ultimate disposition of any given message to be readily traced. As well, a cross-reference keyed collection 36 allows unique message identifiers to be submitted and the source location information of those messages that are duplicates or near duplicates of the unique message to be retrieved. The retrieval information allows the optional reaggregation of selected unique messages and the related duplicate and near duplicates messages at a later time, such as by inclusion into the shadow store 33 at the end of the document review process. Optionally, the duplicate and near duplicate messages can be rejoined with their related unique messages for completeness. The log 34 records not only the disposition of each message, but, in the case of duplicate and near duplicate messages, indicates the unique message with which each duplicate and near duplicate message is associated, thereby permitting specific duplicate and near duplicate messages to be located and optionally reaggregated with selected unique messages at a later time. In the described embodiment, the cross-reference keyed collection 36 is maintained as part of the log 34, but is separately identified for purposes of clarity. The unique messages 44 are copied into the shadow store 33 for forwarding to the next stage of document review.

Figure 3:
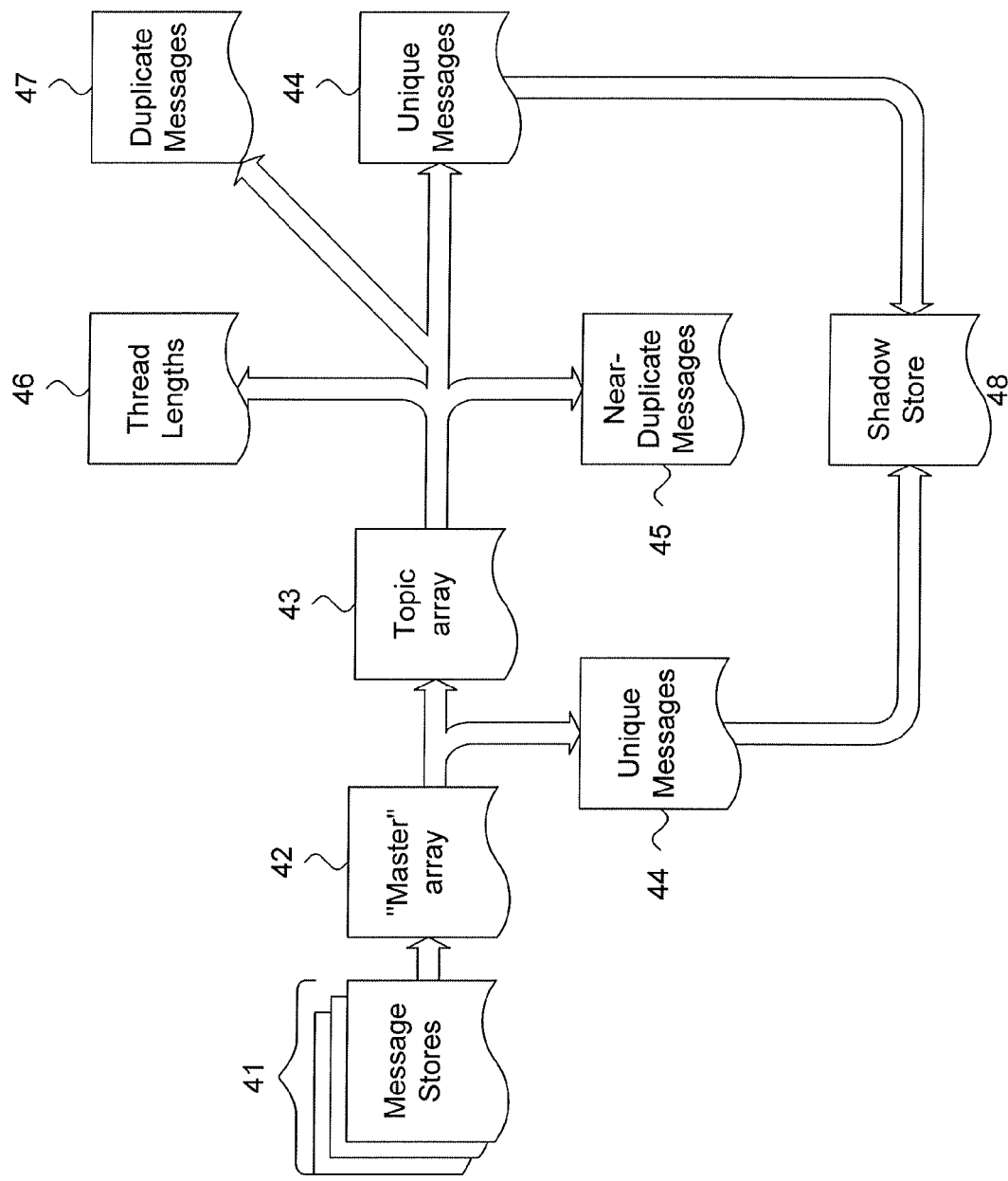
FIG. 3 is a data flow diagram showing the electronic message processing followed by the system of FIG. 2.

FIG. 3 is a data flow diagram 40 showing the electronic message processing cycle followed by the system 30 of FIG. 2. First, the various message stores 41 are opened for access. Metadata consisting of message identification information, including message source location information, and message topics (or subjects), is extracted into a "master" array 42. The master array 42 is a logical collection of the topics and identification information, in the form of metadata, for all of the messages in the various message stores 41. The metadata is manipulated in the various data structures described herein, including the master array 42, topic array 43, and arrays for unique messages 44, near duplicate messages 45, thread lengths 46, and exact duplicate messages 47. However, except as noted otherwise, the messages are described as being directly manipulated during processing, although one skilled in the art would recognize that metadata, messages, or any combination thereof could be used.

The messages in the master array 42 are sorted by topic to identify unique messages and conversation threads, as reflected by ranges of multiple occurrences of the same topic. The identification information (metadata) for those messages having identical topics is extracted into a topic array 43 as each new topic is encountered within the master array 42.

The topic array 43 functions as a working array within which topically identical messages are processed. The identification information extracted from the master array 42 is used to copy into the topic array further information from messages sharing a common topic, including their plaintext. At any point in processing, the topic array 43 contains only those messages sharing a common topic. These topically identical messages are sorted by plaintext body and analyzed. Exact duplicate messages 47, containing substantially duplicated content, are removed from the topic array 43. The remaining non-exact duplicate messages in the topic array 43 are searched for thread markers indicating recursively-included content and conversation thread lengths 46 are tallied. The messages in the topic array 43 are compared and near duplicate messages 45 are identified. The unique messages 45 are marked for transfer into the shadow store 48.

Figure 4:
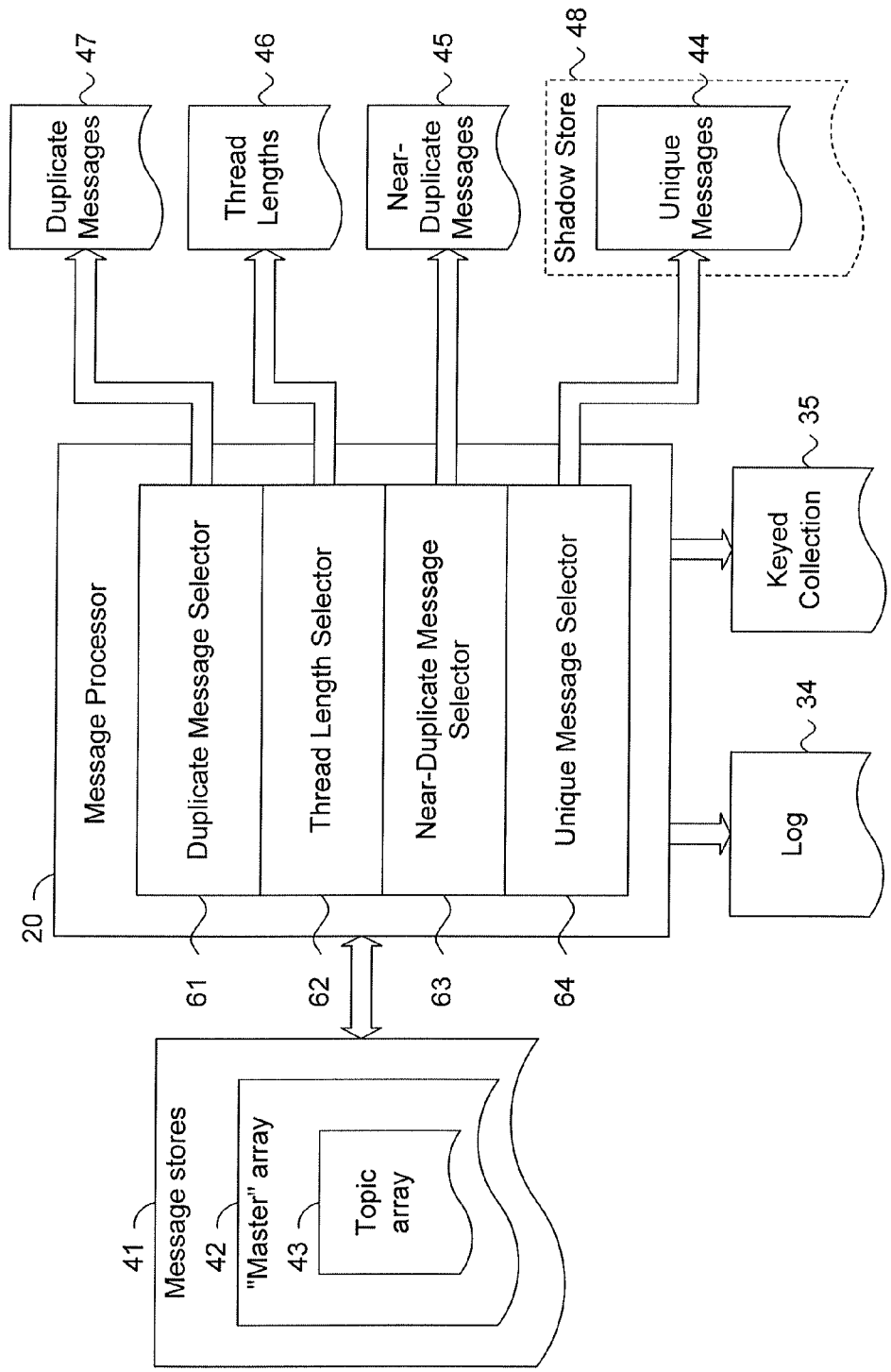
FIG. 4 is a block diagram showing the software modules of the system of FIG. 2.

FIG. 4 is a block diagram showing the software modules 60 of the system 30 of FIG. 2. Each module is a computer program, procedure or module written as source code in a conventional programming language, such as the Visual Basic programming language, and is presented for execution by the CPU as object or byte code, as is known in the art. The various implementations of the source code and object and byte codes can be held on a computer-readable storage medium or embodied on a transmission medium in a carrier wave. The message processor 20 operates in accordance with a sequence of process steps, as further described below beginning with reference to FIG. 6.

The message processor 20 includes four primary modules: exact duplicate message selector 61, thread length selector 62, near duplicate message selector 63, and unique message selector 64. Prior to processing, the message stores 41 are logically consolidated into the master array 42. At each stage of message processing, a log entry is created (or an existing entry modified) in a log 34 to track messages and record message identification information. The exact duplicate message selector 61 identifies and removes those exact duplicate messages 47 containing substantially duplicative content from the topic array 43. The thread length selector 62 tallies the conversation thread lengths 46 and maintains an ordering of thread lengths, preferably from shortest to longest conversation thread length. The near duplicate message selector 63 designates as near duplicate messages 45 those whose content is recursively-included in other messages, such as those messages generated through a reply or forwarding sequence, or as an attachment. The unique message selector 64 designates as unique messages 45 those messages that have been extracted out of the master array 42 as not being topically identical and those messages remaining after the exact duplicate messages 48 and near duplicate messages 46 have been identified. The unique messages 45 are forwarded to the shadow store 48 for use in subsequent document review. The unique, near duplicate, and exact duplicate messages, as well as thread counts, are regularly recorded into the log 34, as the nature of each message is determined. As well, the location information permitting subsequent retrieval of each near duplicate message 45 and exact duplicate message 47 is regularly inserted into the cross-reference keyed collection 36 relating the message to a unique message as the relationship is determined.

FIG. 5 shows, by way of example, an annotated electronic message 70. Often the message having the longest conversation thread length 47 is the most useful message to review. Each preceding message is recursively included within the message having the longest conversation thread length and therefore these near duplicate messages can be skipped in an efficient review process.

The example message 70 includes two recursively-included messages: an original e-mail message 71 and a reply e-mail message 72. The original e-mail message 71 was sent from a first user, user1@ aol.com, to a second user, user2@ aol.com. In reply to the original e-mail message 71, the second user, user2@ aol.com, generated the reply e-mail message 72, sent back to the first user, user1@ aol.com. Finally, the first user, user1@ aol.com, forwarded the reply e-mail message 72, which also included the original e-mail message 71, as a forwarded e-mail message 73, to a third user, user3@ aol.com.

Each of the e-mail messages 71, 72, 73 respectively includes a message body (recursively-included) 74, 78, 82 and a message header 75, 77, 81. The original e-mail message 71 and the reply e-mail message 72 are recursively-included messages. The original e-mail message 71 is recursively included in both the reply e-mail message 72 and forwarded e-mail message 73 while the reply e-mail message 72 is recursively included only in the forwarded e-mail message 73.

Each successive reply, forwarding or similar operation increases the conversation thread length 47 of the message. Thread lengths 47 are indicated within the messages themselves by some form of delimiter. In the example shown, the inclusion of the original e-mail message 71 in the reply e-mail message 72 is delimited by both a separator 80 and a "RE:" indicator in the subject line 79. Likewise, the inclusion of the reply e-mail message 72 is delimited by a separator 84 and a "FW:" indicator in the subject line 83. The message separators 80, 84 and subject line indicators 79, 83 constitute thread "markers" that can be searched, identified and analyzed by the message processor 20 in determining thread lengths 47 and near duplicate messages 46.

Figure 6:
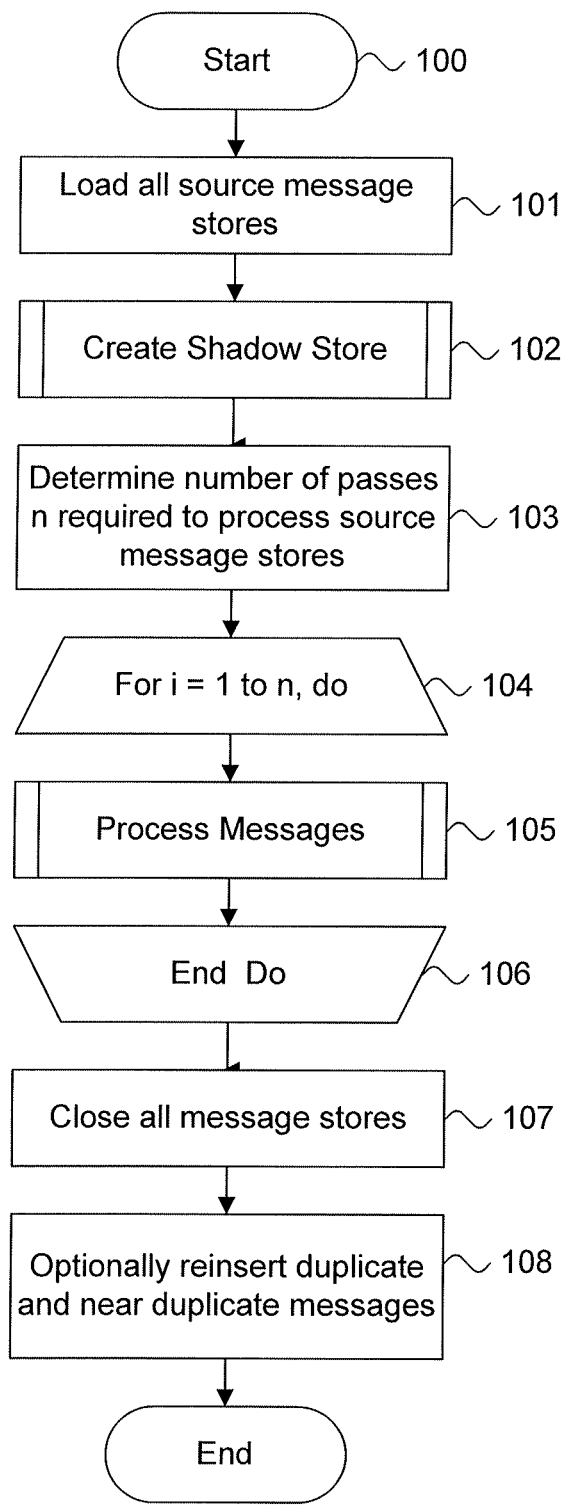
FIG. 6 is a flow diagram showing a method for efficiently processing messages stored in multiple message stores, in accordance with the present invention.

FIG. 6 is a flow diagram showing a method 100 for efficiently processing messages stored in multiple message stores, in accordance with the present invention. The method 100 operates in two phases: initialization (blocks 101-103) and processing (blocks 104-107).

During initialization, the message stores 41 (shown in FIG. 3) are opened for access by the message processor 20 (block 101) and the shadow store 48 is created (block 102), as further described below with reference to FIG. 7. In the described embodiment, the message processor 20 has a finite program capacity presenting an upper bound on the maximum number of electronic messages to be processed during a single run. Consequently, multiple processing passes may be required to process all of the messages stored in the aggregate of the message stores 41.

In the described embodiment, assuming that the aggregate number of messages exceeds the program bounds, the processing is broken down into a series of passes n, during each of which a portion of the aggregate message stores 41 is processed. The number of passes n required to process the source message stores 41 is determined (block 103) by an appropriate equation, such as the following equation:

$$n = ceil\left\lceil \frac{TotNumMessages}{ProgMax} \right\rceil$$

where n equals the total number of iterative passes, TotNumMessages is the total number of messages in the aggregate of the message stores 41, and ProgMax is the maximum program message processing capacity.

In the described embodiment, the aggregate selection of messages from the message stores 41 is processed by overlapping partition i, preferably labeled by dividing the alphabet into partitions corresponding to the number of passes n. For example, if two passes n are required, the partitions would be "less than M" and "greater than L." Similarly, if 52 passes n were required, the partitions would be "less than Am" and "greater than Al and less than Ba."

During operation, the partitions, if required, are processed in an iterative processing loop (blocks 104-106). During each pass n (block 104) the messages are processed (block 105), as further described below beginning with reference to FIG. 8. Upon the completion of the processing (block 106), the message stores 41 are closed (block 107). As an optional operation, the exact duplicate messages 47 and the near duplicates messages 45 are reinserted into the shadow store 48 (block 108). The method terminates upon the completion of processing.

Figure 7:
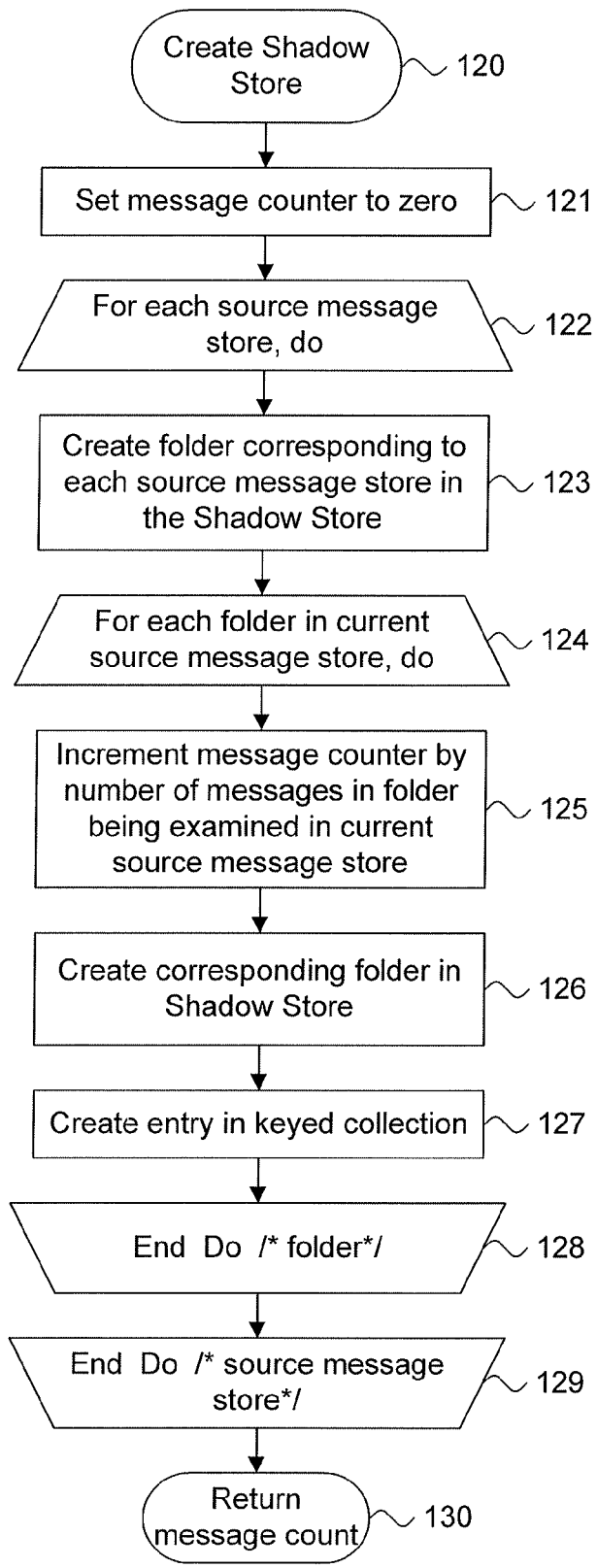
FIG. 7 is a flow diagram showing the routine for creating a shadow store for use in the method of FIG. 6.

FIG. 7 is a flow diagram showing the routine 120 for creating a shadow store for use in the method 100 of FIG. 6. The purpose of this routine is to create a holding area, called the shadow store 48 (shown in FIG. 3) in which unique messages 45 are stored for the next stage in document review. A message counter is maintained to count the messages in the aggregate of all message stores 41. The message counter is initially set to zero (block 121). Each of the source message stores 41 is then processed in a pair of nested iterative processing loops (blocks 122-128 and 124-129), as follows.

During the outer processing loop (blocks 122-129), a folder corresponding to each source message store 41 is created in the shadow store 48 (block 123). Next, each of the folders in the current selected source message store 41 is iteratively processed in the inner processing loop (blocks 124-128) as follows. First, the message counter is incremented by the number of messages in the folder being examined in the source message store 41 (block 125) and a corresponding folder in the shadow store 48 is created (block 126). An entry is made in a point-to-point keyed collection 35 (block 127) that constitutes a cross-reference between a pointer to the original message store 41 or folder in the original message store and a pointer to the newly created corresponding folder or subfolder in the shadow store 48. When unique messages are later copied into the shadow store 48, this keyed file allows the copying to proceed "point-to-point," rather than requiring that the folders in the shadow store 48 be iteratively searched to find the correct one. Processing of each folder in the current source message store 41 continues (block 128) for each remaining folder in the source message store. Similarly, processing of each of the source message stores themselves 41 continues (block 129) for each remaining source message store 41, after which the routine returns (block 130), providing a count of all the messages in all the source message stores so that the number of passes required can be determined.

Figure 8:
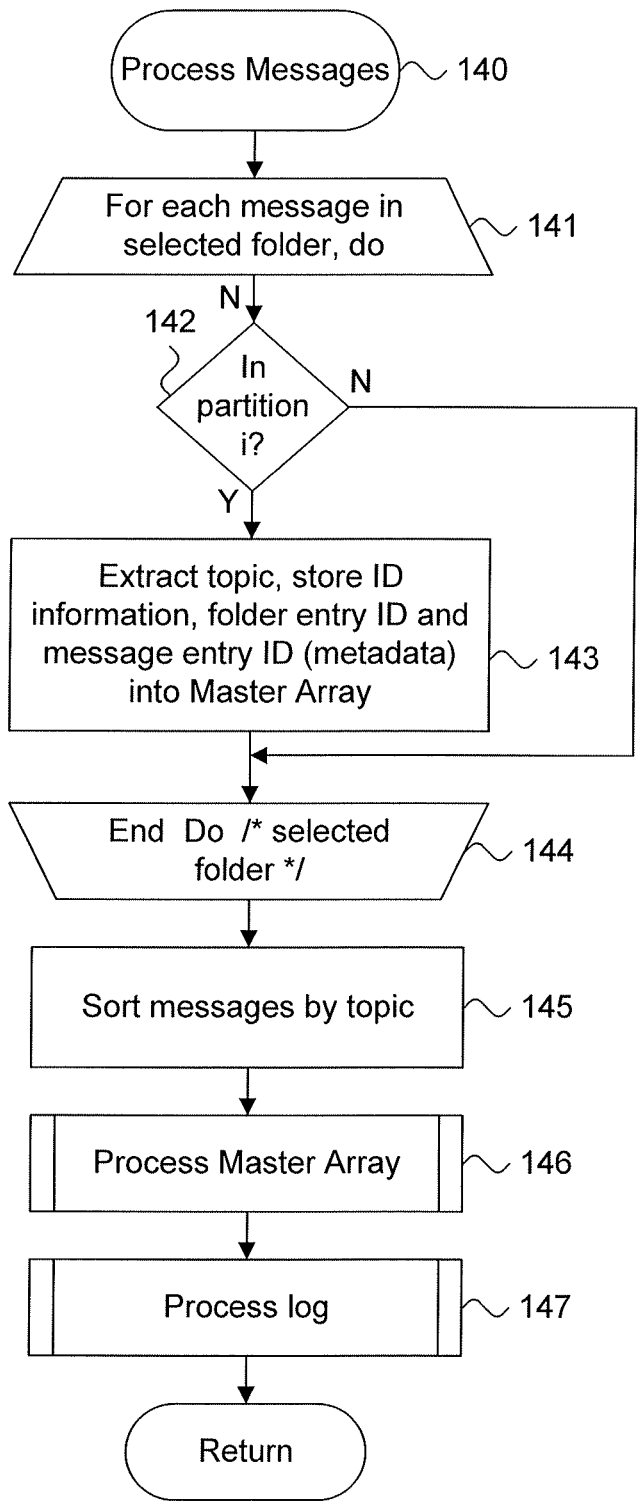
FIG. 8 is a flow diagram showing the routine for processing messages for use in the method of FIG. 6.

FIG. 8 is a flow diagram showing the routine 140 for processing messages for use in the method 100 of FIG. 6. The purpose of this routine is to preprocess the messages stored in the message stores 41. Note at each stage of message processing, a log entry is implicitly entered into the log 34 (shown in FIG. 3) to record the categorization and disposition of each message.

The messages are processed in a processing loop (blocks 141-144). During each iteration (block 141), each message in the selected folder is checked for membership in the current partition i of the source message stores 41 (block 142). If the message is in the current partition i (block 142), the message is logically transferred into the master array 42 (block 143) by extracting the topic and location information, including message identification information and pointers to the source message store 41, the source message folder, and to the individual message (metadata). Using metadata, rather than copying entire messages, conserves storage and memory space and facilitates faster processing. Processing continues for each message in the selected folder (block 144).

When all folders have been processed and the metadata for those messages found to be within the partition has been transferred into the master array, message processing begins. The messages are sorted by topic (block 145) and the master array 42 is processed (block 146), as further described below with reference to FIG. 9. Last, the log 49 is processed (block 147), after which the routine returns.

Figure 9:
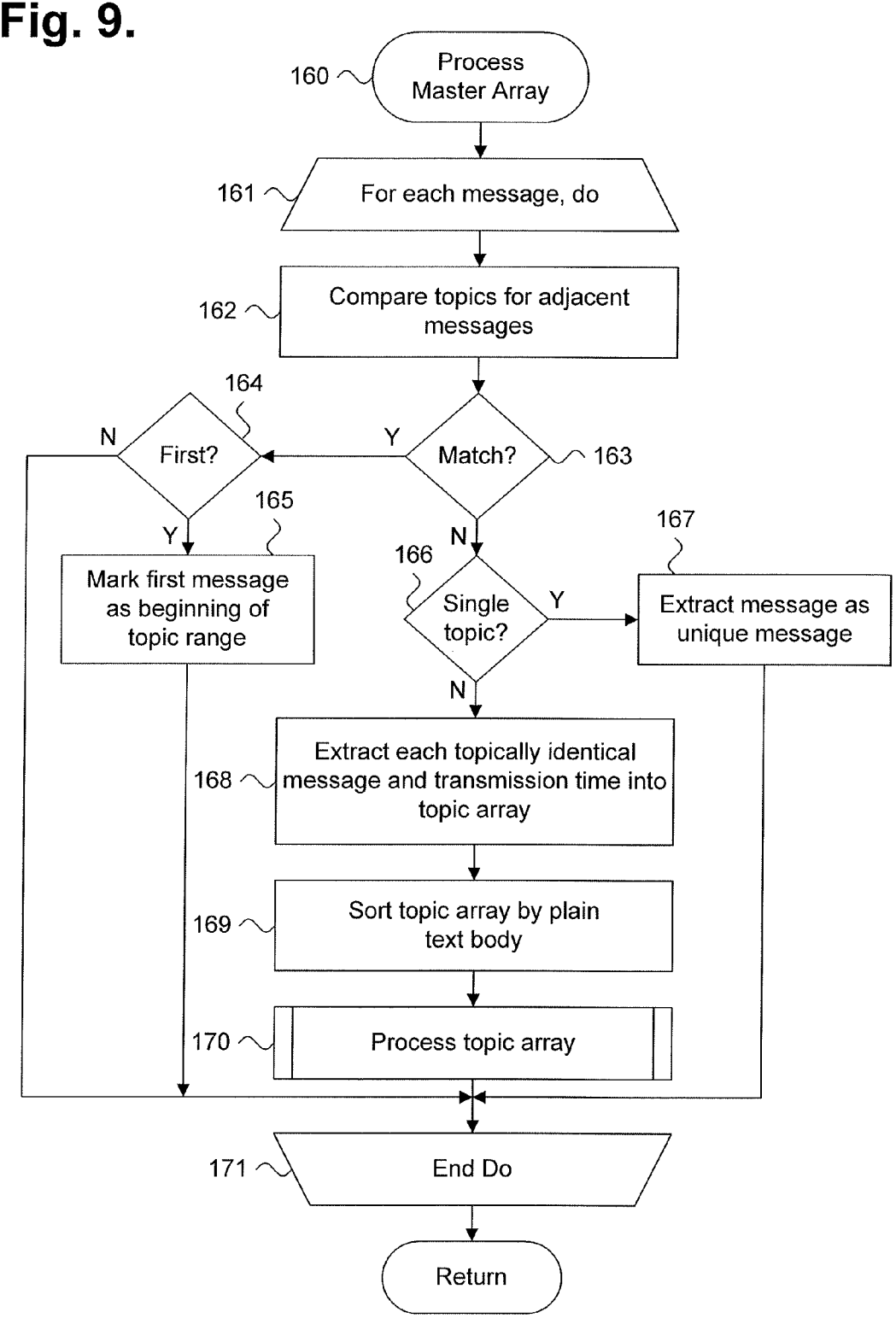
FIG. 9 is a flow diagram showing the routine for processing the master array for use in the routine of FIG. 8.

FIG. 9 is a flow diagram showing the routine 160 for processing the master array 42 for use in the routine 140 of FIG. 8. The purpose of this routine is to identify unique messages 44 and to process topically identical messages using the topic array 43. The routine processes the messages to identify unique and topically similar messages using an iterative processing loop (blocks 161-171). During each iteration (block 161), the topic (or subject line) of the each message in the master array 42 is compared to that of the next message in the master array 42 (block 162). If the topics match (block 163), the messages may be from the same conversation thread. If the message is the first message with the current topic to match the following message (block 164), this first message in the potential thread is marked as the beginning of a topic range (block 165) and processing continues with the next message (block 171). Otherwise, if the message is not the first message in the conversation thread (block 164), the message is skipped and processing continues with the next message (block 171).

If the topics do not match (block 163), the preceding topic range is ending and a new topic range is starting. If the current message was not the first message with that topic (block 166), the range of messages with the same topic (which began with the message marked at block 165) is processed (block 168). If the current message is the first message with the matching topic (block 166), the message is extracted as a unique message 45 (block 167) and processing continues with the next message (block 171). If the topic range has ended (block 166), each topically identical message, plus message transmission time, is logically extracted into the topic array 43 (block 168). In the described embodiment, the messages are not physically copied into the topic array 43; rather, each message is logically "transferred" using metadata into the topic array 43 to provide message source location information, which is used to add a copy of the plaintext body of the message into the topic array. The topic array 43 is sorted by plaintext body (block 169) and processed (block 170), as further described below with reference to FIGS. 10A-C. Processing continues with the next message (block 171). The routine returns upon the processing of the last message in the master array 42.

Figure 10A:
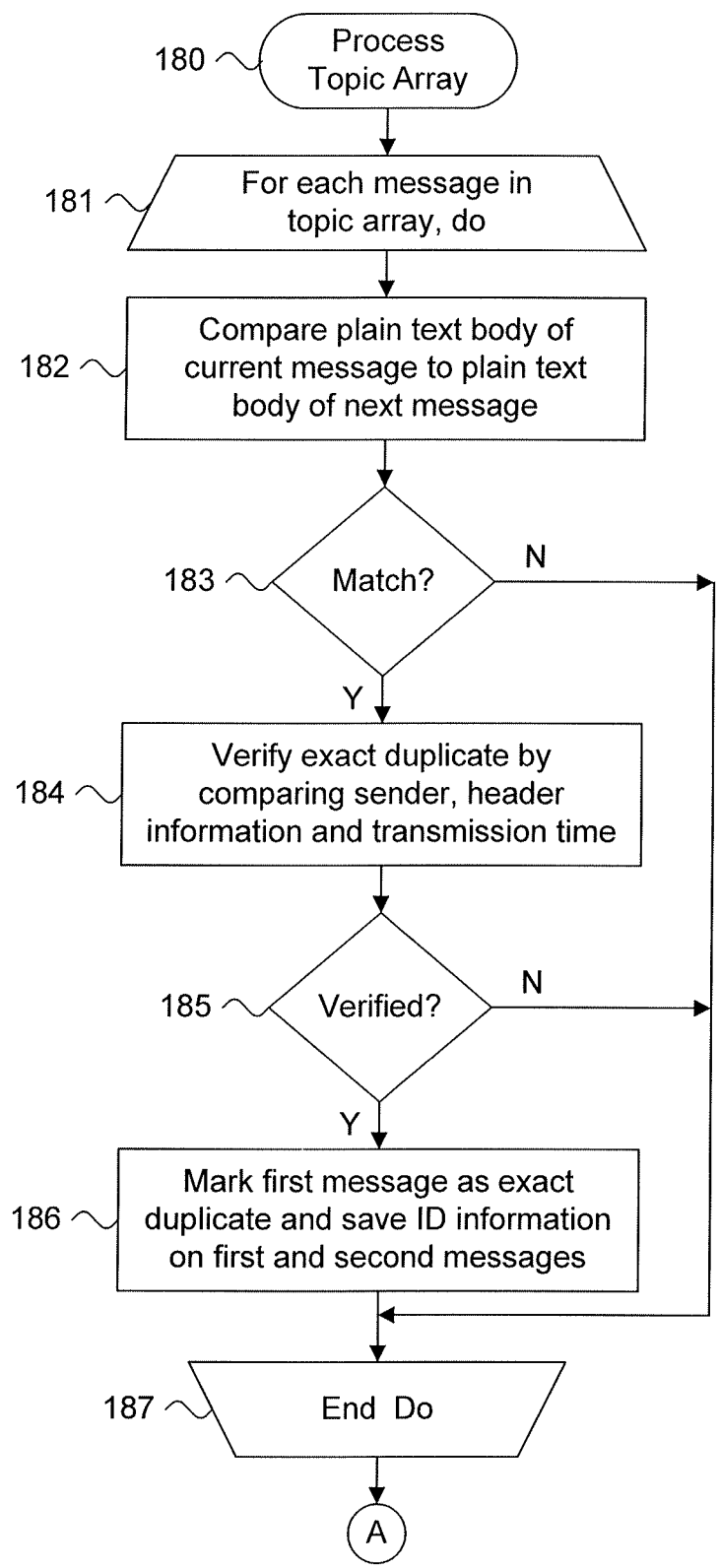
FIGS. 10A-C are flow diagrams showing the routine for processing a topic array for use in the routine of FIG. 9.
Figure 10B:
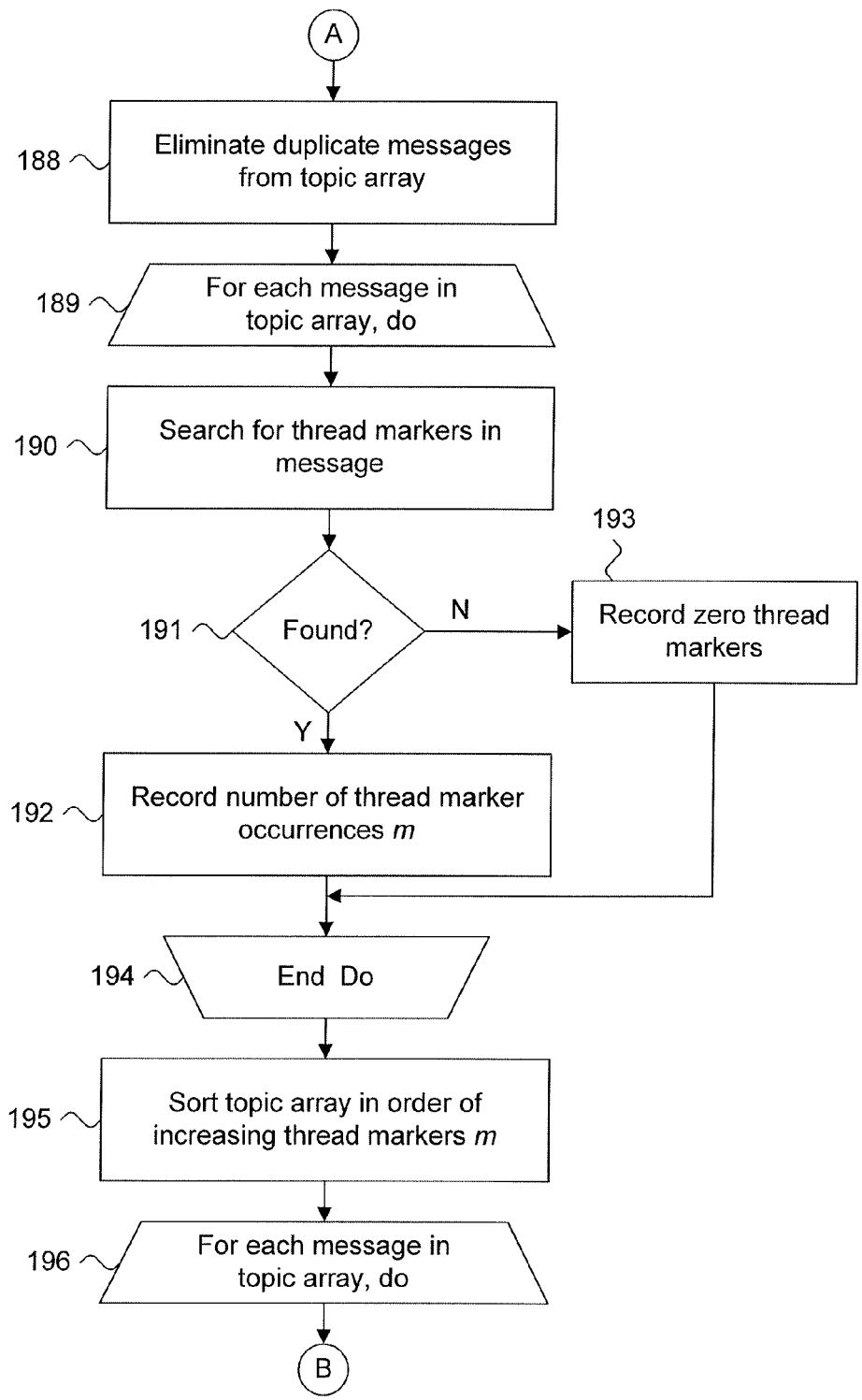
Figure 10C:
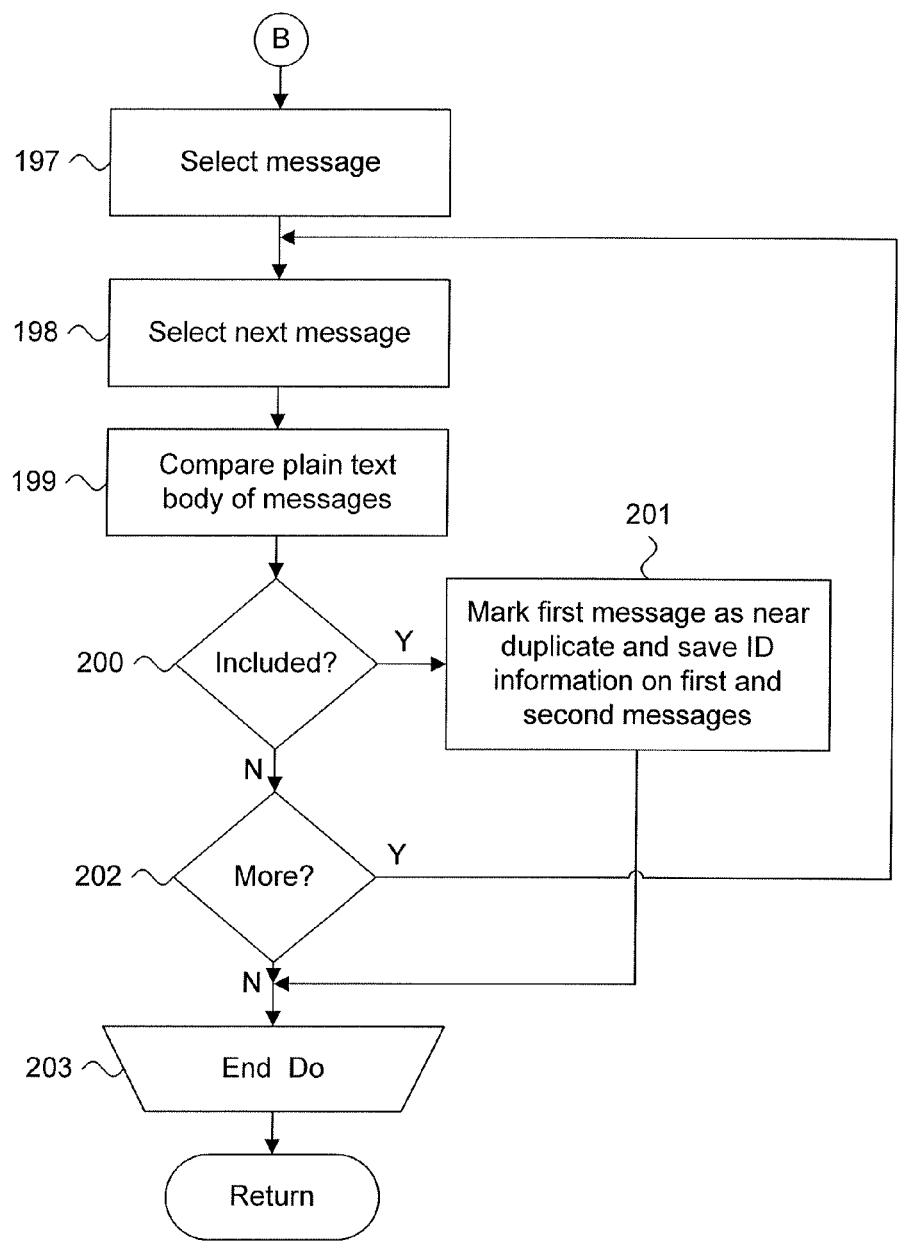

FIGS. 10A-C are flow diagrams showing the routine 180 for processing a topic array for use in the routine 160 of FIG. 9. The purpose of this routine is to complete the processing of the messages, including identifying duplicate, near duplicate and unique messages, and counting thread lengths. The routine cycles through the topic array 43 (shown in FIG. 3) in three iterative processing loops (blocks 181-187, 189-194 and 196-203) as follows.

During the first processing loop (blocks 181-187) each message in the topic array 43 is examined. The plaintext body of the current message is compared to the plaintext body of the next message (block 182). If the plaintext bodies match (block 183), an exact duplicate message possibly exists, pending verification. The candidate exact duplicate is verified by comparing the header information 75, 77, 81 (shown in FIG. 5), the sender of the message (block 184), and the transmission times of each message. If the match is verified (block 185), the first message is marked as an exact duplicate of the second message and the identification information for the first and second messages and their relationship is saved into the log 49 (block 186) and cross-reference keyed collection 36 (shown in FIG. 2). The processing of each subsequent message in the topic array 43 (block 187) continues for the remaining messages.

Next, the messages marked as exact duplicate messages are removed from the topic array 43 (block 188) and the remaining non-exact duplicate messages in the topic array 43 are processed in the second processing loop (blocks 189-194) as follows. First, each message is searched for thread markers, including separators 80, 84 and subject line indicators 79-83 (shown in FIG. 5) (block 190). If thread markers are found (block 191), the number of thread marker occurrences m is counted and recorded (block 192). Otherwise, the message is recorded as having zero thread markers (block 193). In the described embodiment, the data entries having zero thread markers are included in the sorting operations. These messages have message content, but do not include other messages. Recording zero thread markers allows these "first-in-time" messages to be compared against messages which do have included messages. Processing continues for each of the remaining messages (block 194), until all remaining messages in the topic array 43 have been processed.

The topic array is next sorted in order of increasing thread markers m (block 195) and the messages remaining in the topic array 43 are iteratively processed in the third processing loop (block 196-203). During each processing loop (block 196), the first and subsequent messages are selected (blocks 197, 198) and the plaintext body of the messages compared (block 199). In the described embodiment, a text comparison function is utilized to allow large text blocks to be efficiently compared. If the plaintext body of the first selected message is included in the plaintext body of the second selected message (block 200), the first message is marked as a near duplicate of the second message and identification information on the first and second messages and their relationship is saved into the log 49 and cross-reference keyed collection 36 (shown in FIG. 2) (block 201). If the plaintext body of the first selected message is not included in the plaintext body of the second selected message and additional messages occur subsequent to the second message in the topic array 43 (block 202), the next message is selected and compared as before (blocks 198-202). Each subsequent message in the topic array is processed (block 203) until all remaining messages have been processed, after which the routine returns.

Figure 11:
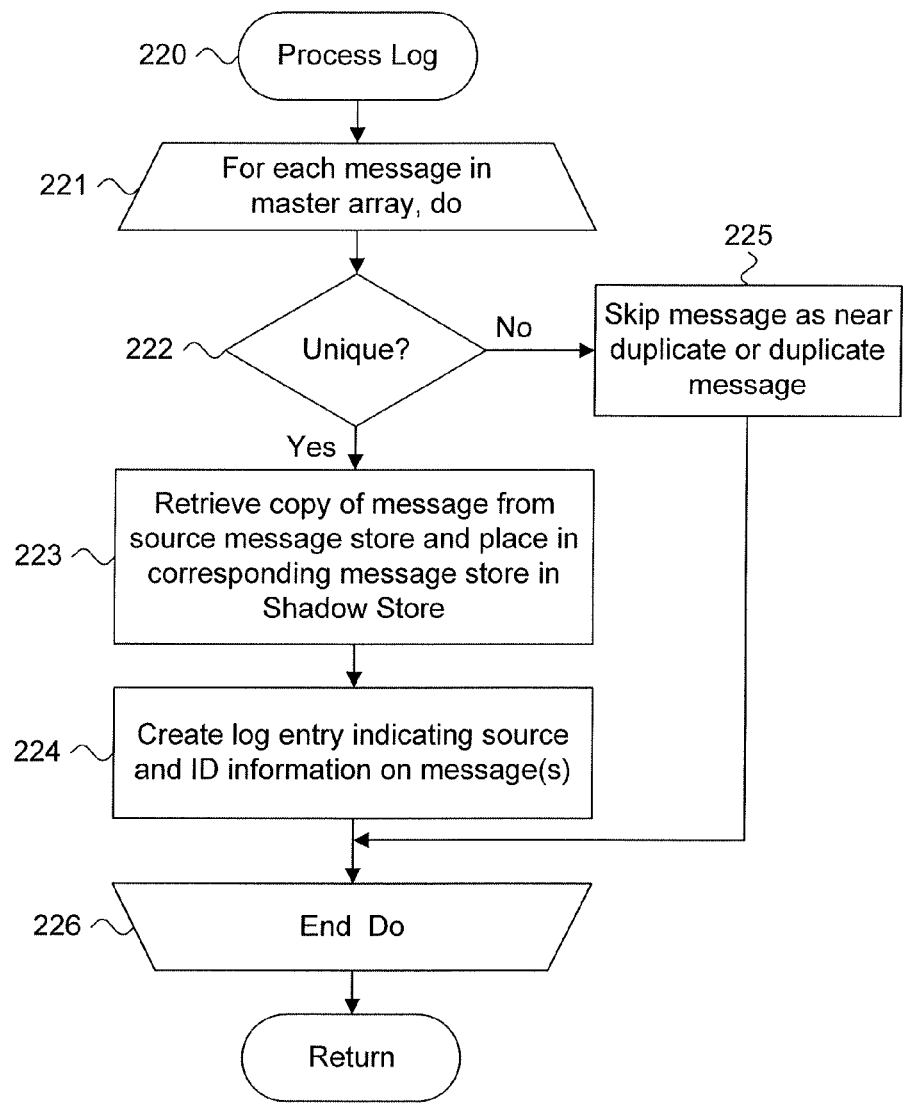
FIG. 11 is a flow diagram showing the routine for processing a log for use in the routine of FIG. 8.

FIG. 11 is a flow diagram showing the routine 220 for processing a log for use in the routine 140 of FIG. 8. The purpose of this routine is to finalize the log 34 for use in the review process. Processing occurs in an iterative processing loop (block 221-226) as follows. Each message in the master array 42 is processed during each loop (block 221). If the selected message is a unique message 45 (block 222), a copy of the message is retrieved from the source folder in the source message store 41 (shown in FIG. 3) and placed into the corresponding folder in the corresponding message store in the shadow store 48 (block 223) (using the cross-reference keyed collection 36 created at the time of creating the shadow store 34), plus an entry with message source location information and identification information is created in the log 34 (block 224). Otherwise, the message is skipped as a near duplicate message 45 or exact duplicate message 47 (block 225) that is not forwarded into the next phase of the document review process. Processing of each subsequent message in the master array 42 continues (block 226) for all remaining messages, after which the routine returns.

Figure 12:
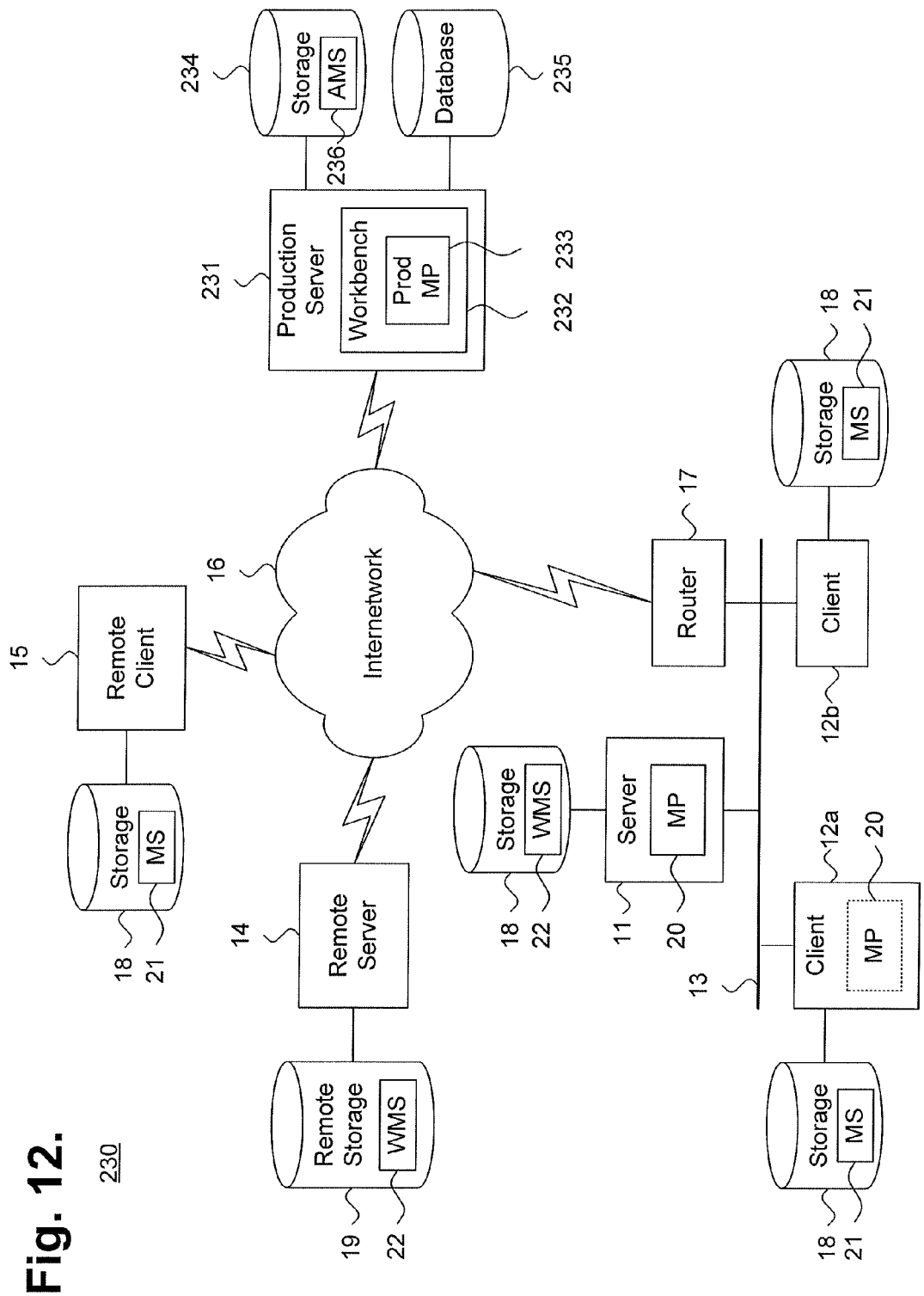
FIG. 12 is a functional block diagram showing a distributed computing environment, including a system for evaluating a structured message store for message redundancy, in accordance with a further embodiment of the present invention.

FIG. 12 is a functional block diagram showing a distributed computing environment 230, including a system for evaluating a structured message store for message redundancy, in accordance with a further embodiment of the present invention. In addition to the message processor 20 executing on the server 11, a production server 231 includes a workbench application 232 for providing a framework for acquiring, logging, culling, and preparing documents for automated review and analysis. The workbench application 232 includes a production message processor (Prod MP) 233 for efficiently processing the electronic messages stored in the individual message stores 21 and the workgroup message stores 22, as further described below beginning with reference to FIG. 13.

The production server 231 maintains an archived message store (AMS) 236 on a storage device 234 and a database 235. The production server 231 preferably functions as an off-line message processing facility, which receives individual message stores 21 and workgroup message stores 22 for document review processing as the archived message stores 236. The database 235 abstracts the contents of individual messages extracted from the archived message stores 236 into structured message records as a form of standardized representation for efficient processing and identification of duplicative content, including attachments, as further described below with reference to FIG. 15.

Figure 13:
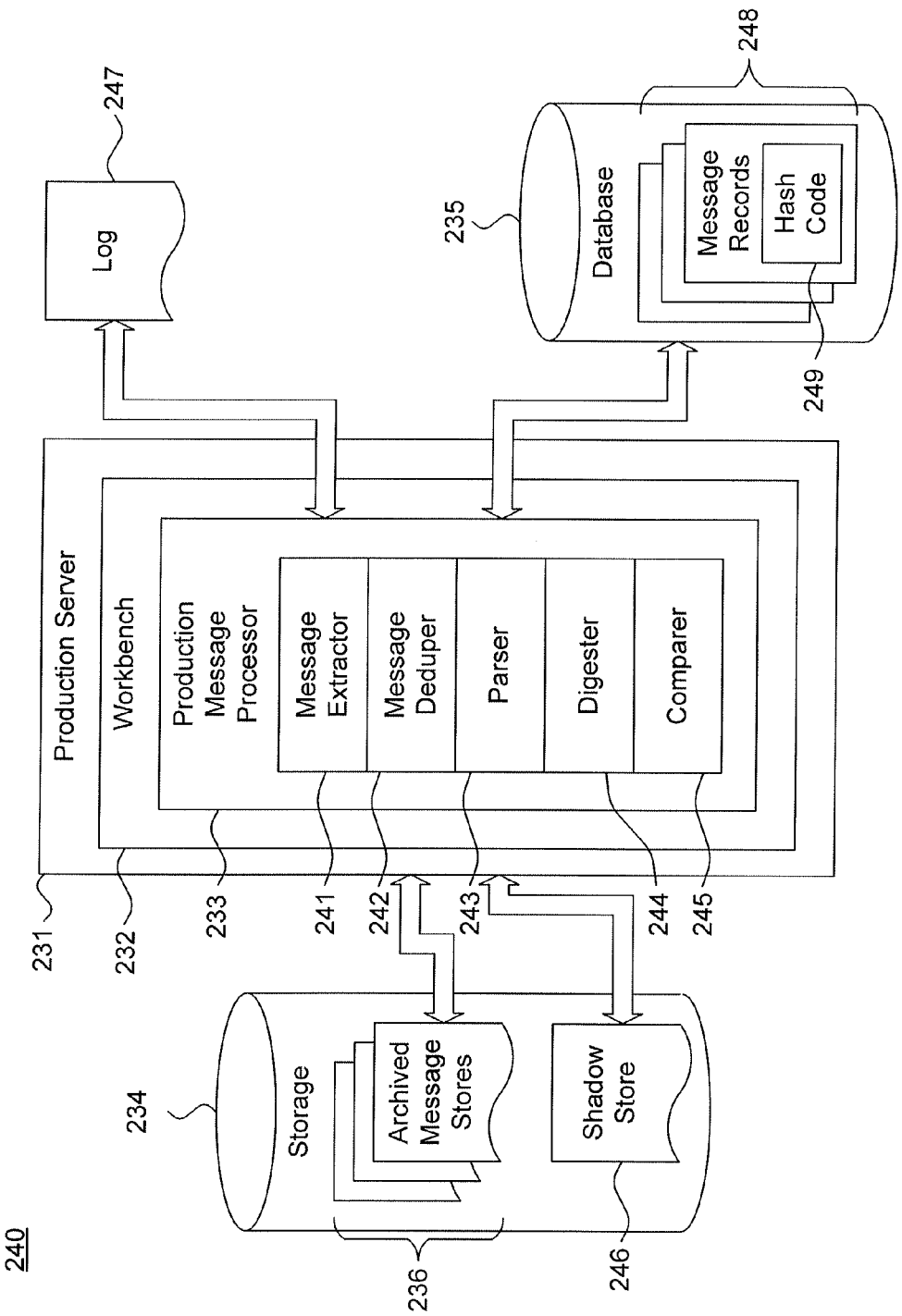
FIG. 13 is a block diagram showing the software modules of the production server of FIG. 12.

FIG. 13 is a block diagram showing the software modules of the production server 231 of FIG. 12. The workbench application 232 executes on the production server 231, preferably as a stand-alone application for processing messages consolidated from the individual message stores 21 and the workgroup message stores 22 into the consolidated message store 236. The workbench application 232 includes the production message processor 233 for identifying unique messages and culling out duplicate and near duplicate messages.

The production message server 233 includes five primary modules: message extractor 241, message de-duper 242, parser 243, digester 244, and comparer 245. Prior to processing, the production message processor 233 logically assembles the archived message stores 236 by first importing each individual message store 21 and workgroup message store 22 from the physical storage media upon which the message store 21, 22 is maintained. The archived message stores 236 provide a normalized electronic storage structure independent of physical storage media. Consequently, importing each individual message 21 and workgroup message store 22 can include converting the message store from a compressed or archival storage format into a standardized "working" message store format for message access and retrieval. In the described embodiment, the formats used for individual messages and message stores as used in the Outlook family of messaging applications, licensed by Microsoft Corporation, Redmond, Wash., and cc:mail family of messaging applications, licensed by Lotus Corporation, Cambridge, Mass., are supported, and other messaging application formats could likewise be supported, as would be recognized by one skilled in the art. At each stage of message processing, a log entry can be created (or an existing log entry modified) in a log 247 for tracking messages and recording message identification information.

The message extractor 241 retrieves each individual message from the archived message stores 236. The parser 243 parses individual fields from each extracted message and identifies message routing, identification information and literal content within each field. The parsed metadata and message body are then stored in message records 248 maintained in the database 235, as further described below with reference to FIG. 15. Each message record 248 includes a hash code 249 associated with the message, which is calculated by the digester 244, exclusive of any attachments. Each attachment also includes a separately calculated attachment hash code 249. Each hash code 249 is a sequence of alphanumeric characters representing the content, also referred to as a digest.

The hash codes 249 are calculated using a one-way function to generate a substantially unique alphanumeric value, including a purely numeric or alphabetic value, associated with the message or attachment. The hash codes 249 are calculated over at least part of each message header, plus the complete message body. If the message includes attachments, separate attachment hash codes 249 are calculated over at least part of each attachment. For each message, the hash code 249 can be calculated over at least part of the header, plus the complete message body. In addition, the demarcation between the data constituting a header and the data constituting a message body can vary and other logical grouping of data into headers, message bodies, or other structures or groupings are possible, as would be recognized by one skilled in the art.

In the described embodiment, the MD5 hashing algorithm, which stands for "Message Digest No. 5," is utilized and converts an arbitrary sequence of bytes having any length into a finite 128-bit digest, such as described in D. Gourley and B. Tatty, "HTTP, the Definitive Guide," pp. 288-299, O'Reilly and Assocs., Sebastopol, Calif. (2002), the disclosure of which is incorporated by reference. Other forms of cryptographic check summing, one-way hash functions, and fingerprinting functions are possible, including the Secure Hash Algorithm (SHA), and other related approaches, as would be recognized by one skilled in the art.

Once the message records 248 in the database 235 have been populated with the extracted messages, the message de-duper 242 identifies unique messages, exact duplicate messages, and near duplicate messages, as further described below with reference to FIG. 18. The messages are grouped by message hash codes 249 and each group of matching hash codes 249 is analyzed by comparing the content and the hash codes 249 for each message and any associated attachments to identify unique messages, exact duplicate messages, and near duplicate messages. A hash code appearing in a group having only one message corresponds to a unique message. A hash code appearing in a group having two or more messages corresponds to a set of exact duplicate messages with either no attachments or with identical attachments. Optionally, the exact duplicate messages and near duplicate messages can be maintained in a shadow store 246 for data integrity and auditing purposes.

Figure 14:
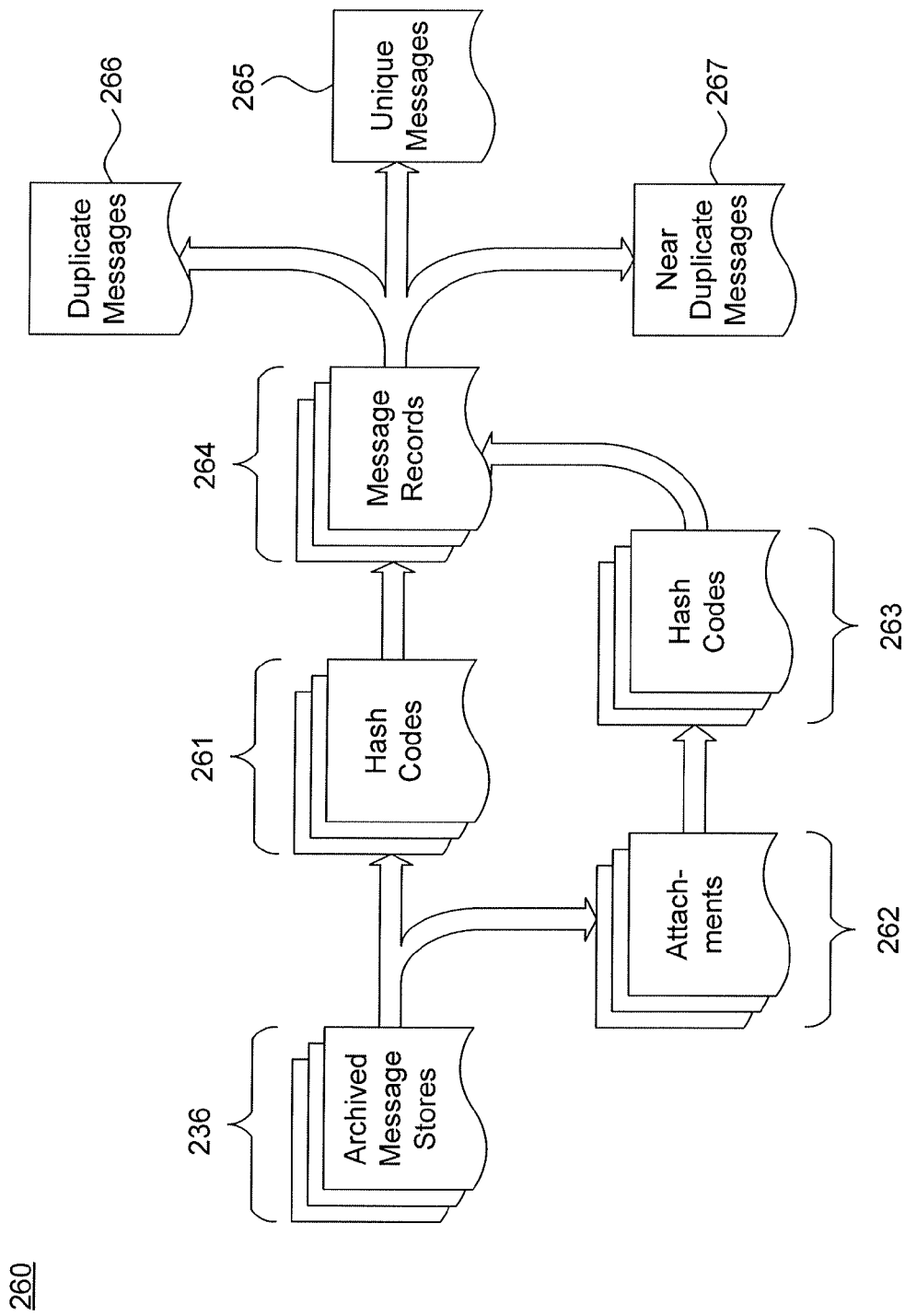
FIG. 14 is a data flow diagram showing the electronic message processing followed by the production server of FIG. 13.

FIG. 14 is a data flow diagram showing the electronic message processing 260 followed by the production server 231 of FIG. 13. First, the various archived message stores 236 are first opened for access. For each message in each of the archived message stores 236, metadata consisting of message routing, identification information and literal content are extracted. The metadata and message body, exclusive of any attachments, are calculated into a message hash code 261. In tandem, any attachments 262 are calculated into attachment hash codes 263. The metadata, message body, hash code 261, and hash codes 263 for any attachments are stored into the database 235 as message records 264. Each of the message records 264 is uniquely identified, as further described below with reference to FIG. 15. Finally, the message records 264 are retrieved from the database 235 and processed to identify unique messages 265, exact duplicate messages 266, and near duplicate messages 267, as further described below with reference to FIG. 18.

Figure 15:
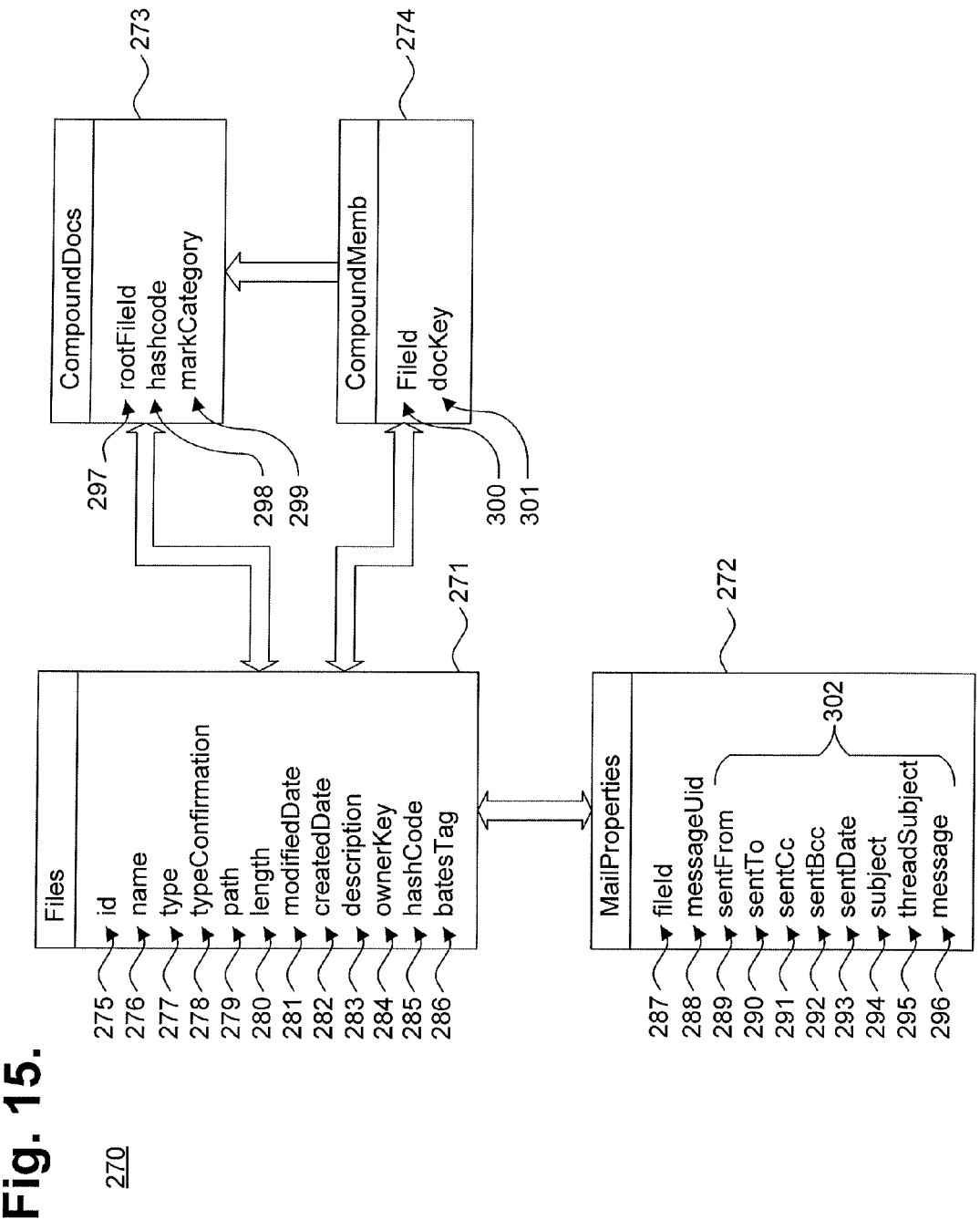
FIG. 15 shows, by way of example, a database schema used by the production server of FIG. 13.

FIG. 15 shows, by way of example, a database schema 270 used by the production server 231 of FIG. 13. The message records 248 in the database 235 are preferably structured in a hierarchical organization consisting of tables for individual message files 271, mail properties (MailProperties) 272, compound documents (CompoundDocs) 273, and compound members (CompoundMembers) 274, although other forms of hierarchical and non-hierarchical organization are feasible, as would be recognized by one skilled in the art.

The files table 271 stores one record for each individual message extracted from the archived message stores 236. Each record in the files table 271 shares a one-to-one relationship with an extracted message. Each record is assigned a unique, monotonically increasing identification number (id) 275. The files table 271 includes fields for storing the extracted message name 276, type 277, type confirmation 278, path 279, length 280, modified date 281, created date 282, description 283, owner key 284, and Bates tag 286. In addition, the hash code 261 for the extracted message, exclusive of any attachments, is stored in a hash code field 285.

The mail properties table 272 contains the message routing, identification information and literal content associated with each extracted message. Each record in the mail properties table 272 shares a one-to-one relationship with an associated record in the files table 271. Each record in the mail properties table 272 is identified by a file identifier (FileId) 287. The mail properties table 272 includes fields for storing message unique ID 288, sent from 289, sent to 290, sent cc 291, sent bcc 292, sent date 293, subject 294, thread subject 295, and message 296. The hash code 261 is calculated by the digester 244 using select fields 302 of each record, which include all of the fields except the file identifier 287 and message unique ID 288 fields, although one skilled in the art would recognize that other combinations and selections of fields could also be used to calculate the hash code 261.

The compound documents table 273 and compound members table 274 share a one-to-many relationship with each other. The records in the compound documents table 273 and compound members table 274 store any attachments associated with a given extracted message stored in a record in the file table 271. Each record in the compound documents table 273 contains a root file identifier (routeFileId) 297. The compound documents table 273 includes fields for storing marked category 299 and the hash code 263 is stored in a hash code field 298. Each record in the compound documents table 273 shares a one-to-many relationship with each attachment associated with an extracted message. Similarly, each record in the compound members 274 is uniquely identified by a file ID (FieldId) 300 field and a compound document key field 301.

Figure 16:
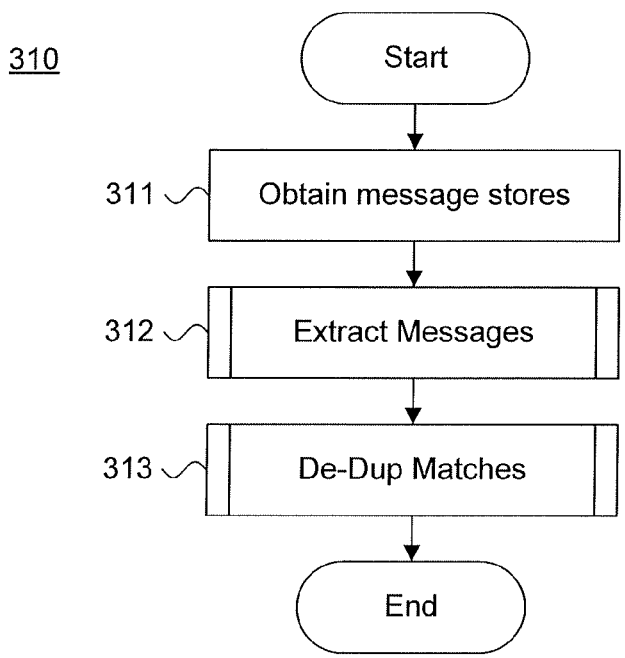
FIG. 16 is a flow diagram showing a method for evaluating a structured message store for message redundancy, in accordance with a further embodiment of the present invention.

FIG. 16 is a flow diagram showing a method 310 for evaluating a structured message store for message redundancy, in accordance with a further embodiment of the present invention. The method 310 operates in three phases. During the first phase, the individual message stores 21 and workgroup message stores 22 are obtained and consolidated into the archived message stores 236 (block 311). The individual message stores 21 and workgroup message stores 22 can be in physically disparate storage formats, such as on archival tapes or other forms of on-line or off-line archival media, and could constitute compressed data. Consequently, each of the individual message stores 21 and workgroup message stores 22 are converted into a standardized on-line format for message identity processing.

During the second phase, individual messages are extracted from the archived message stores 236 (block 213), as further described below with reference to FIG. 17. Briefly, individual messages are extracted from the archived message stores 236, digested into hash codes 261 and 263, and stored as message records 248 in the database 235.

During the third phase, the extracted messages, as stored in message records 248 in the database 235, are "de-dupped," that is, processed to identify unique messages 265, exact duplicate messages 266, and near duplicate messages 267 (block 313). Finally, the routine terminates.

Figure 17A:
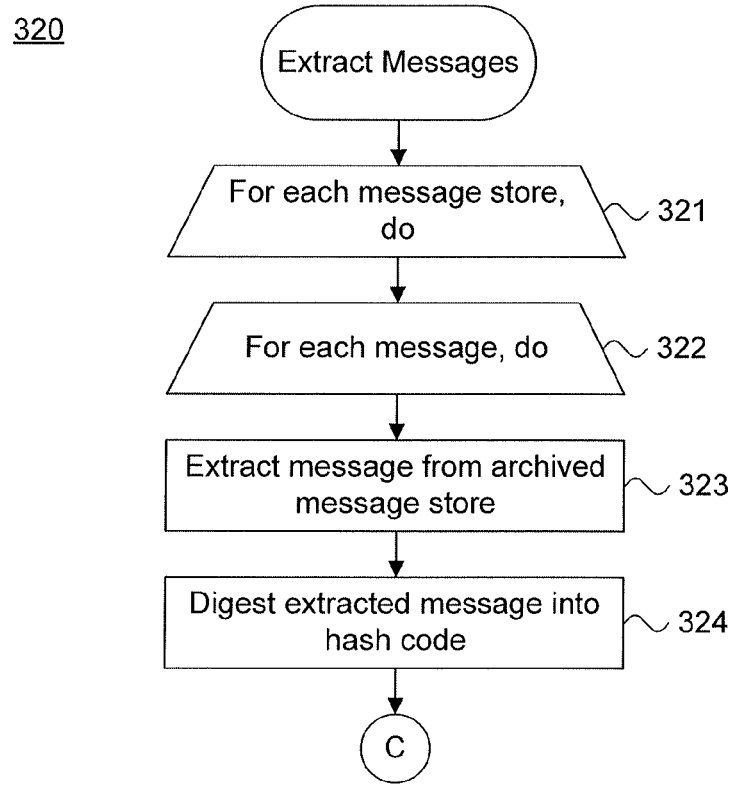
FIGS. 17A-B are flow diagrams showing the routine for extracting messages for use in the method of FIG. 16.
Figure 17B:
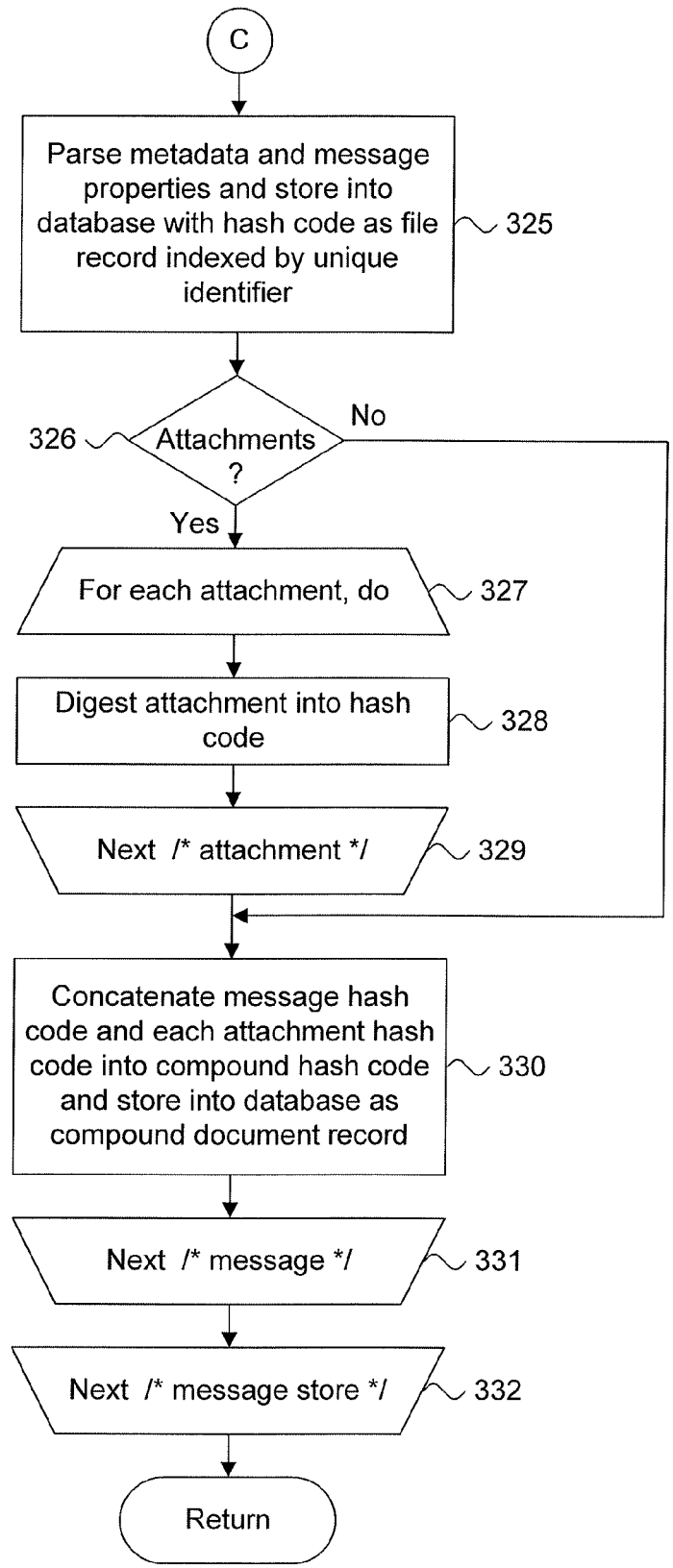

FIGS. 17A-B are flow diagrams showing the routine 320 for extracting messages for use in the method 310 of FIG. 16. The purpose of this routine is to iteratively process each of the extracted message stores 236 and individual messages to populate the message records 239 stored in the database 235.

The messages in each of the archived message stores 236 are iteratively processed in a pair of nested processing loops (blocks 321-333 and blocks 322-332, respectively). Each of the archived message stores 236 is processed during an iteration of the outer processing loop (block 321). Each message stored in an archived message store 236 is processed during an iteration of the inner processing loop (block 322). Each message is extracted from an archived message store 236 (block 322) and each extracted message is digested into a hash code 261 over at least part of the header, plus the complete message body, exclusive of any attachments (block 324). Each hash code is a sequence of alphanumeric characters representing the content, also referred to as a digest. The hash codes are calculated using a one-way function to generate a substantially unique alphanumeric value, including a purely numeric or alphabetic value, associated with message or attachment. In the described embodiment, the MD5 hashing algorithm is used to form a fixed-length 128-bit digest of each extracted message and routing information. Next, the metadata for each extracted message is parsed and stored into records in the files table 271 and mail properties table 272 along with the hash code 261 and indexed by a unique identifier 275 (block 325).

If the extracted message contains one or more attachments (block 326), each attachment is iteratively processed (blocks 327-329) as follows. At least part of each attachment is digested by the digester 244 into a hash code 263 (block 328). Each remaining attachment is iteratively processed (block 329). The message hash code 261 and each attachment hash code 263 are concatenated into a compound hash code and are stored as a compound document record in the compound documents table 273 and the compound members table 274 (block 330). Note the message hash code 261 and each attachment hash code 263 could also be logically concatenated and stored separately, as would be recognized by one skilled in the art. Each message in the archived message store 236 is iteratively processed (block 331) and each archived message store 236 is iteratively processed (block 332), after which the routine returns.

Figure 18A:
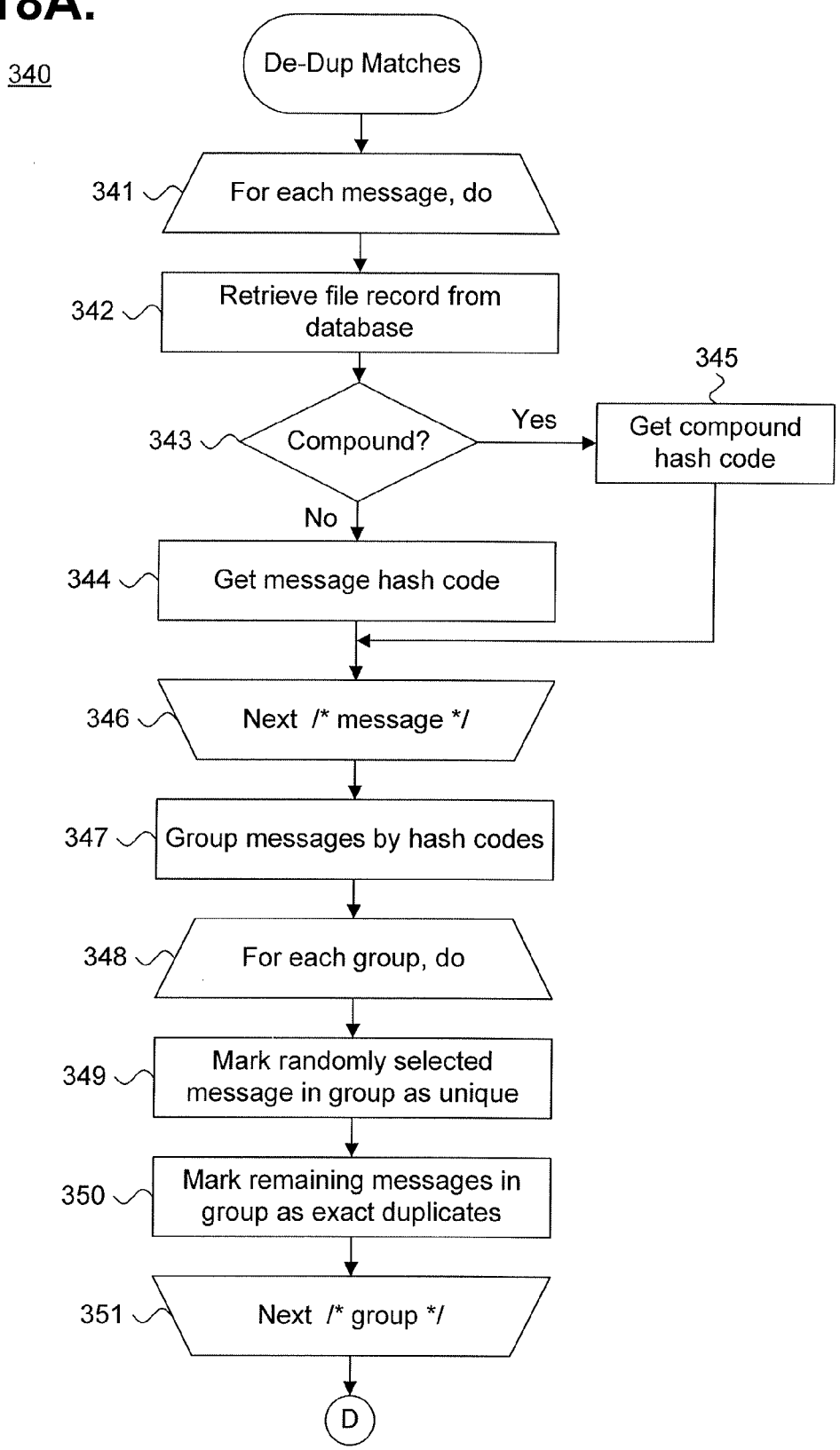
FIGS. 18A-C are flow diagrams showing the routine for de-duping messages for use in the method of FIG. 16.
Figure 18B:
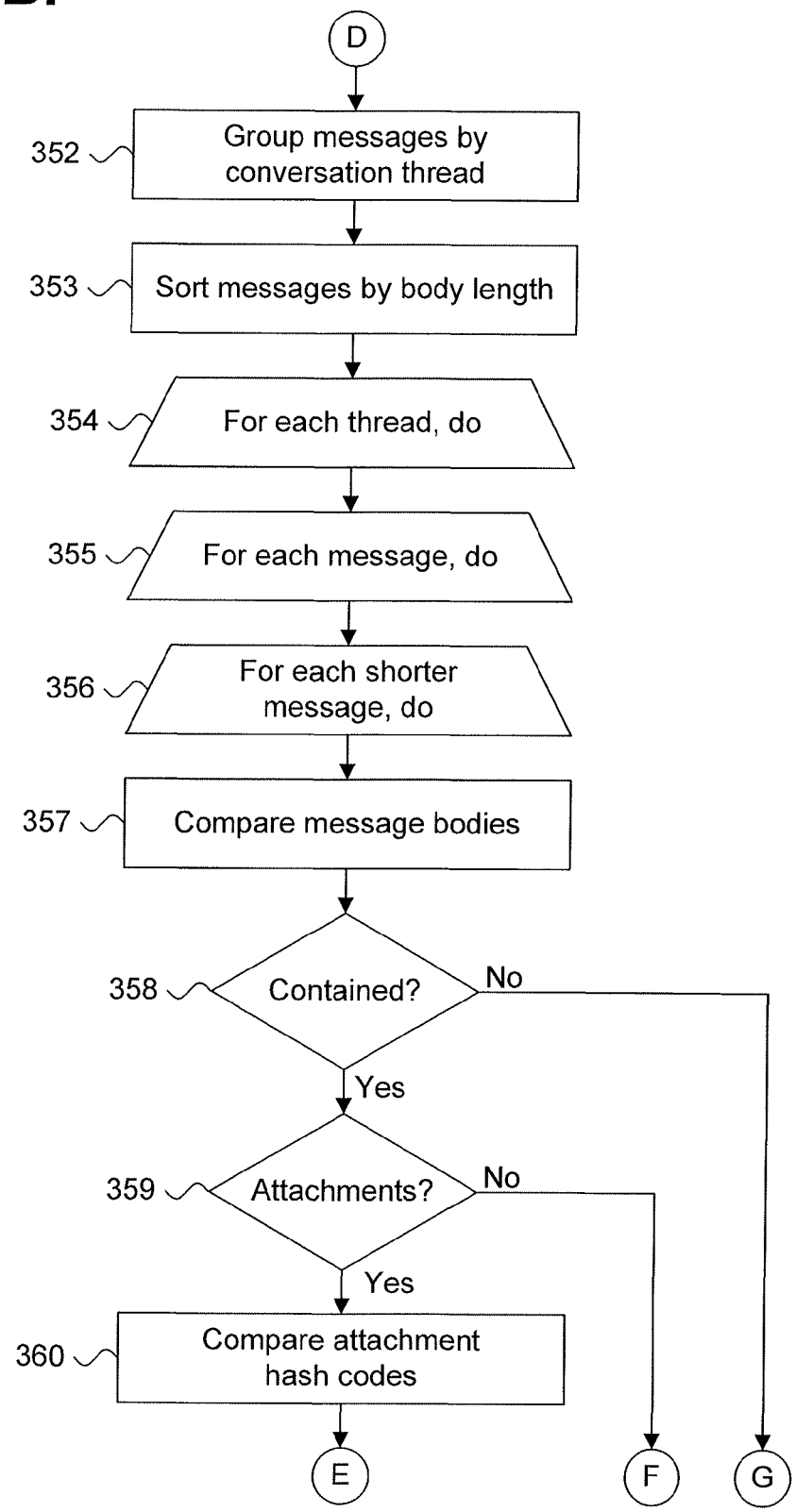
Figure 18C:
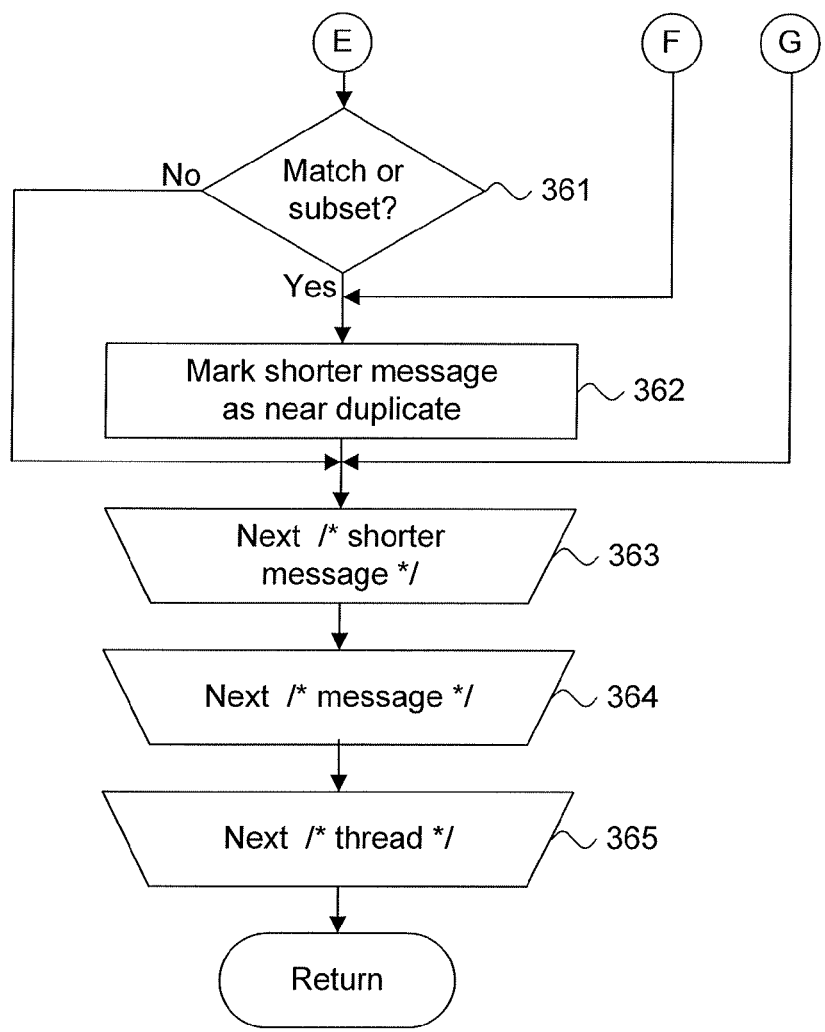

FIGS. 18A-C are flow diagrams showing the routine 340 for de-duping messages for use in the method 310 of FIG. 16. The purpose of this routine is to identify unique messages 265, exact duplicate messages 266, and near duplicate messages 267 ("de-dup") through a process known as "culling."

The messages stored in records in the database 235 are iteratively processed in a processing loop (blocks 341-346). Each message is processed during an iteration of the processing loop (block 341). First, the file record 271 corresponding to each message is retrieved from the database 235 (block 342). If the message is not a compound message, that is, the message does not contain attachments (block 343), the message hash code 261 is obtained (block 344) and processing continues with the next message (block 346). Otherwise, if the message is a compound message (block 343), the compound hash code is obtained (block 345) and processing continues with the next message (block 346).

Next, the messages are grouped by matching hash codes (block 347) and each group of matching hash codes is iteratively processed in a processing loop (blocks 348-351). Any groups with more than one message are processed to identify exact duplicates based on matching hash codes. A randomly selected message in the group is marked as a unique message (block 349) and the remaining messages in the group are culled, that is, marked as exact duplicates messages (block 350). Other methodologies for selecting the unique message can be used, as would be recognized by one skilled in the art. Processing continues with the next group (block 351).

Next, all non-exact duplicate messages are now iteratively processed for near-duplicates. The messages are grouped by conversation thread (block 352). In the described embodiment, the messages are sorted in descending order of message body length (block 353), although the messages could alternatively be sorted in ascending order, as would be recognized by one skilled in the art. The threads, messages, and "shorter" messages are then iteratively processed in a series of nested processing loops (blocks 354-365, 355-364, and 356-363, respectively). Each thread is processed during an iteration of the outer processing loop (block 354). Each message within the thread is processed during an iteration of an inner processing loop (block 355) and each message within the thread having an equal or shorter length, that is, each shorter message, is processed during an iteration of an innermost processing loop (block 356). The message bodies of the first message and the shorter message are compared (block 357). If the message bodies are not contained within each other (block 358), the shorter message is left marked as a unique message and the processing continues with the next shorter message (block 363).

Otherwise, if the message body of the shorter message is contained within the message body of the first message (block 358), the attachment hash codes 263 are compared (block 359) to identify unique messages 265 and near duplicate messages 267, as follows. First, if the message does not include any attachments, the shorter message is culled, that is, marked as a near duplicate of the first message (block 362). If the message includes attachments (block 359), the individual attachment hash codes 263 are compared to identify a matching or subset relationship (block 360). If the attachment hash codes 263 indicate a matching or subset relationship between the first message and the shorter message (block 361), the shorter message is culled, that is, marked as a near duplicate message 267 of the first message (block 362). Otherwise, the shorter message is left marked as a unique message 265. Processing continues with the next shorter message in the thread (block 363). After all shorter messages have been processed (block 363), processing continues with the next message (block 364) and next thread (block 365), respectively. The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for selecting documents for review, comprising:
    a master array comprising messages and topics of the messages; and
    a processor to execute modules, comprising:
        a sort module to sort the messages in the master array by the topics;
        a message processing module to process the sorted messages by identifying each message in the master array as unique, duplicate, or near duplicate, by extracting the unique messages from the duplicate and near duplicate messages, and by entering the unique messages into a log by creating a log entry for each of the unique messages, wherein each log entry comprises a source of and identification information for one of the unique messages;
        a message counter to determine a maximum number of the messages to be processed during a single pass;
        a pass determination module to determine a number of the passes required for processing the messages based on the maximum number of messages via the following equation:

$$n = ceil\left[\frac{TotNumMessages}{ProgMax}\right]$$

where n equals a total number of the processing passes, TotNumMessages is the total number of messages, and ProgMax is the maximum number of messages to be processed; and
    a delivery module to provide the unique messages for document review.

2. A system according to claim 1, wherein the delivery module provides the duplicate and near duplicate messages for one or more of the unique messages during the document review.

3. A system according to claim 1, further comprising:
    a reference module to cross reference in the log each unique message with the duplicate and near duplicate messages for that unique message.

4. A system according to claim 1, further comprising:
    a holding area for the unique messages extracted from the duplicate and near duplicate messages.

5. A system according to claim 1, wherein the messages are stored in one or more original message stores.

6. A system according to claim 5, further comprising:
    a point-to-point keyed collection storing cross-references between an identifier of the original message store for each message and an identifier of a newly created folder into which that message is placed after processing.

7. A system according to claim 1, further comprising:
    an identification module to identify at least one of the duplicate and near duplicate messages for a common unique message as having a longest thread.

8. A system according to claim 7, further comprising:
    a thread identification module to identify the duplicate or near duplicate message with the longest thread by identifying a number of thread markers for each of the duplicate and near duplicate messages for the common unique message and sorting the duplicate and near duplicate messages in order of increasing number of the thread markers.

9. A computer-implemented method for selecting documents for review, comprising:
    generating a master array comprising messages and topics of the messages;
    sorting the messages in the master array by the topics;
    processing the sorted messages in one or more passes, comprising:
        identifying each message in the master array as unique, duplicate, or near duplicate; and
        extracting the unique messages from the duplicate and near duplicate messages and entering the unique messages into a log by creating a log entry for each of the unique messages, wherein each log entry comprises a source of and identification information for one of the unique messages;
    determining a maximum number of the messages to be processed during a pass;
    determining a number of the passes required for processing the messages based on the maximum number of messages via the following equation:

$$n = ceil\left[\frac{TotNumMessages}{ProgMax}\right]$$

where n equals a total number of the processing passes, TotNumMessages is the total number of the messages, and ProgMax is the maximum number of the messages to be processed; and
    providing the unique messages for document review.

10. A method according to claim 9, further comprising:
  providing the duplicate and near duplicate messages for one or more of the unique messages during the document review.

11. A method according to claim 9, further comprising:
  cross referencing in the log each unique message with the duplicate and near duplicate messages for that unique message.

12. A method according to claim 9, further comprising:
  creating a holding area for the unique messages extracted from the duplicate and near duplicate messages.

13. A method according to claim 9, wherein the messages are stored in one or more original message stores.

14. A method according to claim 13, further comprising:
  generating a point-to-point keyed collection storing cross-references between an identifier of the original message store for each message and an identifier of a newly created folder into which that message is placed after processing.

15. A method according to claim 9, further comprising:
  identifying at least one of the duplicate and near duplicate messages for a common unique message as having a longest thread.

16. A method according to claim 15, further comprising:
  identifying the duplicate or near duplicate message with the longest thread, comprising:
    identifying a number of thread markers for each of the duplicate and near duplicate messages for the common unique message; and
  sorting the duplicate and near duplicate messages in order of increasing number of the thread markers.

* * * * *